United States Patent
Abdalla et al.

(10) Patent No.: US 12,496,541 B2
(45) Date of Patent: Dec. 16, 2025

(54) EASY LOCK SPIN-ON FILTER

(71) Applicant: CUMMINS FILTRATION INC., Nashville, TN (US)

(72) Inventors: Wassem Abdalla, Fishers, IN (US); Robert A. Bannister, Ames, IA (US); Vaibhav Pimpalte, Pune (IN)

(73) Assignee: CUMMINS FILTRATION INC., Nashville, TN (US)

( * ) Notice: Subject to any disclaimer, the term of this patent is extended or adjusted under 35 U.S.C. 154(b) by 494 days.

(21) Appl. No.: 17/801,348

(22) PCT Filed: Feb. 22, 2021

(86) PCT No.: PCT/US2021/019032
§ 371 (c)(1),
(2) Date: Aug. 22, 2022

(87) PCT Pub. No.: WO2021/173487
PCT Pub. Date: Sep. 2, 2021

(65) Prior Publication Data
US 2023/0079235 A1 Mar. 16, 2023

(30) Foreign Application Priority Data
Feb. 24, 2020 (IN) .............................. 202041007686

(51) Int. Cl.
*B01D 35/30* (2006.01)
*B01D 29/13* (2006.01)
*F01M 11/03* (2006.01)

(52) U.S. Cl.
CPC ........... *B01D 35/306* (2013.01); *B01D 29/13* (2013.01); *F01M 11/03* (2013.01);
(Continued)

(58) Field of Classification Search
CPC .................. B01D 35/306; B01D 29/13; B01D 2201/295; B01D 2201/301;
(Continued)

(56) References Cited

U.S. PATENT DOCUMENTS 5,988,399 A * 11/1999 Brown ................. B01D 27/005
210/DIG. 17
7,237,682 B2 7/2007 Reynolds et al.
(Continued)

FOREIGN PATENT DOCUMENTS

CN 109475797 A 3/2019
DE 10 2014 010 007 A1 1/2016
(Continued)

OTHER PUBLICATIONS

First Office Action issued for Chinese Patent Application No. 202180014728.8 issued Jan. 31, 2024, 9 pages.
(Continued)

*Primary Examiner* — Waqaas Ali
(74) *Attorney, Agent, or Firm* — Benesch Friedlander Coplan & Aronoff LLP

(57) ABSTRACT

A filter cartridge includes a shell, a connecting ring, an end cap, and an axially directed sealing member. The shell defines an inner cavity and an upper lip disposed along an upper edge of the inner cavity. The upper lip defines a channel. The connecting ring is positioned outside of the inner cavity and is engaged with the channel. The connecting ring includes a threaded region extending along a central axis of the shell. The end cap is engaged with the shell adjacent to the upper lip. The axially directed sealing member is positioned between the shell and the end cap and extends axially outward so as to form an axial seal with a filter head when the filter cartridge is installed on the filter head.

10 Claims, 21 Drawing Sheets

(52) U.S. Cl.
CPC .. *B01D 2201/295* (2013.01); *B01D 2201/301* (2013.01); *B01D 2201/342* (2013.01); *B01D 2201/4076* (2013.01); *B01D 2201/4092* (2013.01); *F01M 2011/031* (2013.01)

(58) Field of Classification Search
CPC ...... B01D 2201/342; B01D 2201/4076; B01D 2201/4092; B01D 29/15; B01D 2201/0415; B01D 2201/291; F01M 11/03; F01M 2011/031
See application file for complete search history.

(56) References Cited

U.S. PATENT DOCUMENTS

| | | | | |
|---|---|---|---|---|
| 8,241,384 | B2* | 8/2012 | Schrage | B01D 46/0004 55/498 |
| 2006/0219626 | A1 | 10/2006 | Dworatzek et al. | |
| 2008/0203614 | A1* | 8/2008 | Holzmann | B01D 46/521 264/257 |
| 2010/0176047 | A1* | 7/2010 | Bagci | B01D 27/005 210/232 |
| 2011/0132829 | A1* | 6/2011 | Tucker | B01D 35/30 210/232 |
| 2014/0021119 | A1 | 1/2014 | Malgorn et al. | |
| 2014/0208702 | A1 | 7/2014 | Lundgren et al. | |
| 2019/0366248 | A1 | 12/2019 | Hawkins | |

FOREIGN PATENT DOCUMENTS

| | | | |
|---|---|---|---|
| JP | 2004-195311 A1 | 7/2004 | |
| JP | 2018-143986 A | 9/2018 | |
| WO | WO-97/22394 A1 | 6/1997 | |
| WO | WO-2009/149186 A1 | 12/2009 | |
| WO | WO-2017/151336 A1 | 9/2017 | |
| WO | WO-2018/075063 A1 | 4/2018 | |
| WO | WO-2019/173736 | 9/2019 | |
| WO | WO-2019173736 A1 * | 9/2019 | ............ B01D 27/06 |

OTHER PUBLICATIONS

Partial Search Report issued for European Patent Application No. 20170074.6, issued Jan. 31, 2024, 18 pages.
Supplemental Search Report issued for European Patent Application No. 20170074.6, issued Apr. 23, 2024, 14 pages.
International Search Report and Written Opinion based on PCT Application No. PCT/US2021/019032 issued May 3, 2021, 14 pages.

* cited by examiner

EASY LOCK SPIN-ON FILTER

CROSS-REFERENCE TO RELATED PATENT APPLICATIONS

The present application is a National Phase Application based on PCT/US2021/019032, filed Feb. 22, 2021, which claims the benefit of and priority to Indian Provisional Patent Application No. 202041007686, filed Feb. 24, 2020. The contents of these applications are hereby incorporated by references in their entireties.

TECHNICAL FIELD

The present disclosure relates generally to filters for use with internal combustion engine systems. More specifically, the present disclosure relates to spin-on filters including a threaded interface.

BACKGROUND

Internal combustion engine systems require various fluids (e.g., lubricating oil, fuel, etc.) to operate. The fluids are generally passed through a filter cartridge to remove water and other contaminants. The filter cartridge may include a particulate filter cartridge and/or a fuel-water separator. The filter cartridge may include a threaded interface to engage the filter cartridge with the engine system and to allow for periodic replacement of the filter cartridge.

SUMMARY

One embodiment of the present disclosure relates to a filter assembly. The filter assembly includes a shell, a connecting ring, an end cap, and an axially directed sealing member. The shell defines an inner cavity and an upper lip disposed along an upper edge of the inner cavity. The upper lip defines a channel. The connecting ring is positioned outside of the inner cavity and is engaged with the channel. The connecting ring includes a threaded region extending along a central axis of the shell. The end cap is engaged with the shell adjacent to the upper lip. The axially directed sealing member is positioned between the shell and the end cap and extends axially outward so as to form an axial seal with a filter head when the filter cartridge is installed on the filter head.

In some embodiments, the shell defines a ledge positioned between the upper lip and a lower elongated cylindrical portion of the shell. The axially directed sealing member may be positioned on the ledge.

Another embodiment of the present disclosure relates to a filter housing. The filter housing includes a shell and a connecting ring. The shell defines an inner cavity and an upper lip that is disposed along an upper edge of the inner cavity. The upper lip defines a channel. The connecting ring is positioned outside of the inner cavity and is engaged with the channel. The connecting ring includes a threaded region that extends along a central axis of the shell.

Yet another embodiment of the present disclosure relates to a connecting ring for a spin-on filter cartridge. The connecting ring includes a threaded region, a cylindrical extension, and a connecting member. The threaded region extends circumferentially about a central axis. The cylindrical extension is coupled to the threaded region and extends axially away from the threaded region. The connecting member is disposed on the cylindrical extension and is structured to engage a shell of the spin-on filter cartridge to couple the connecting ring to the shell.

Yet another embodiment of the present disclosure relates to a filter assembly. The filter assembly includes a shell, a filter element, and an axially directed sealing member. The shell includes a body and a connecting ring. The body defines an inner cavity and an upper lip. The upper lip is disposed along an upper edge of the inner cavity and defines a channel. The connecting ring is positioned outside of the inner cavity and is engaged with the channel. The connecting ring includes a threaded region extending along a central axis of the body. The filter element is removably disposed within the shell, and includes an endcap that is engaged with the shell. The axially directed sealing member is positioned between the body and the end cap, and extends axially outward so as to form an axial seal with a filter head when the filter assembly is installed on the filter head.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
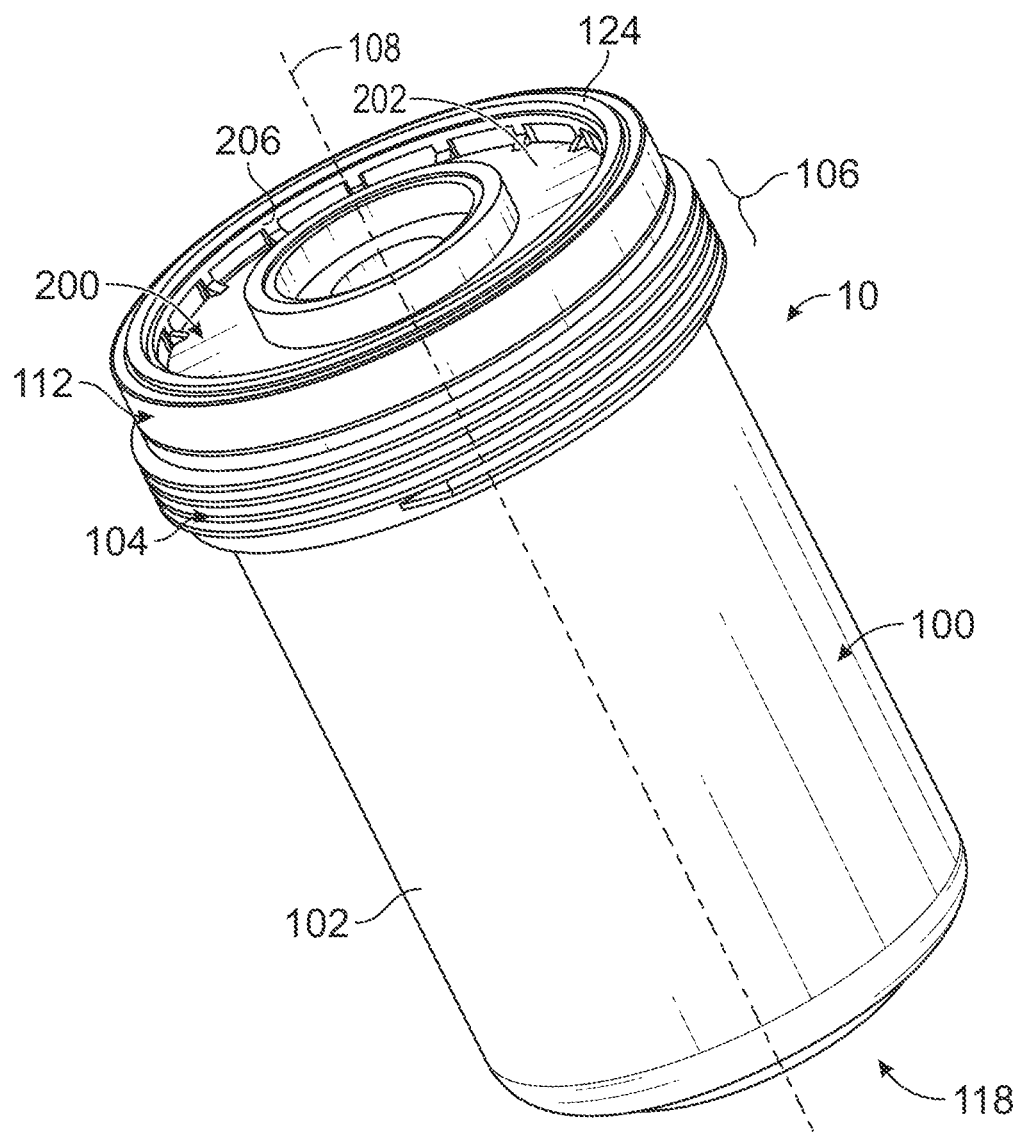
FIG. 1 is a perspective view of a filter assembly, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to spin-on filter cartridges for internal combustion engine systems. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Spin-on filter cartridges (i.e., spin-on filters) for internal combustion engine systems may include a filter element inserted into an outer shell. The spin-on filter cartridges may also include threaded fittings (e.g., nutplates) with sealing grooves that must be glued or otherwise secured onto the shell to hold the filter element in place within the shell and to facilitate sealing between the clean and dirty sides of the filter cartridge. The threaded fittings are also used to connect the filter cartridge to a filter head (e.g., to threadably engage the filter cartridge with the filter head). However, seaming operations used to embed the threaded fittings onto the shell are often complicated and can introduce contaminants into the filter cartridge. Additionally, the threaded fittings may prevent removal of the filter element from the shell, so that the shell must be disposed of during replacement of the filter cartridge. Moreover, because the threaded fittings are permanently affixed to the shell, any damage to the threaded fitting requires replacement of the entire spin-on filter cartridge including the shell housing.

The spin-on filter cartridges of the present disclosure provide a threaded connecting ring that is produced separately from the shell, and that engages the shell to form the threaded interface for the spin-on filter cartridge. Among other benefits, the spin-on filter cartridge design reduces the number of components needed for a regular spin-on filter. The connecting ring may also be applied to the shell manually (e.g., by someone's hands under their own force or using a simple press), rather than using more complex seaming operations that are traditionally used to embed the threaded interface into the shell.

In at least one embodiment, the shell defines an inner cavity and an upper lip that is disposed along an upper edge of the inner cavity. The upper lip may define a channel sized to receive the connecting ring therein. The connecting ring may be coupled to the channel, for example, via one or more deformable ribs disposed along a perimeter of the connecting ring. In another embodiment, the connecting ring includes interlocking elements (e.g., tabs, connecting lips) that engage with the upper lip via apertures that are disposed along a perimeter of the upper lip. In at least one embodiment, the connecting ring is removable from the shell. For example, the connecting ring may include a twist lock, snap, and/or locking tab that engages with interfacing features on the shell (e.g., apertures in the upper lip, etc.) to connect the connecting ring to the shell. In the event that the connecting ring becomes damaged, it may be removed from the shell and replaced with a new connecting ring, without causing damage to the shell or filter element endcap. The shell and/or connecting ring may also include anti-rotational features to rotationally couple the connecting ring to the shell and to ensure the shell rotates with the connecting ring during installation and removal of the spin-on filter cartridge.

In at least one embodiment, the connecting ring is overmolded onto the shell. For example, the shell may be placed into a molding tool and the plastic may be injection molded around it (e.g., through apertures in the upper lip, etc.). In at least one embodiment, the upper lip of the shell may form part of a sealing interface between the clean and dirty sides of the filter element. For example, the shell may further define a ledge positioned between the upper lip and a lower elongated cylindrical portion of the shell. The ledge may abut an outer protrusion of the filter element endcap and form a channel between the filter element endcap and the upper lip. An axially directed sealing member may be positioned in the channel between the shell and the endcap and may extend axially outward from the ledge to form an axial seal with the filter head.

II. Example Spin-On Filter Cartridge

FIGS. 1-5 show a spin-on filter cartridge 10 (e.g., a filter assembly), according to an embodiment. The filter cartridge 10 is structured to remove particulate contaminants from a working and/or lubricating fluid for an internal combustion engine system (e.g., lubricating engine oil, hydraulic oil, etc.). The filter cartridge 10 includes a filter housing 100, a connecting ring 104, and a filter element 200. The filter element 200 is removably coupled to the filter housing 100. In other words, the filter housing 100 is reusable. The connecting ring 104 is configured to removably couple the filter cartridge 10 to an engine block of the engine system and/or filter head. In particular, the connecting ring 104 includes (e.g., defines) a threaded region 106 (e.g., external threading) extending along a central axis 108 of the connecting ring 104 (and shell 102) and configured to threadably engage with a threaded region on the engine block or filter mounting head.

Figure 2:
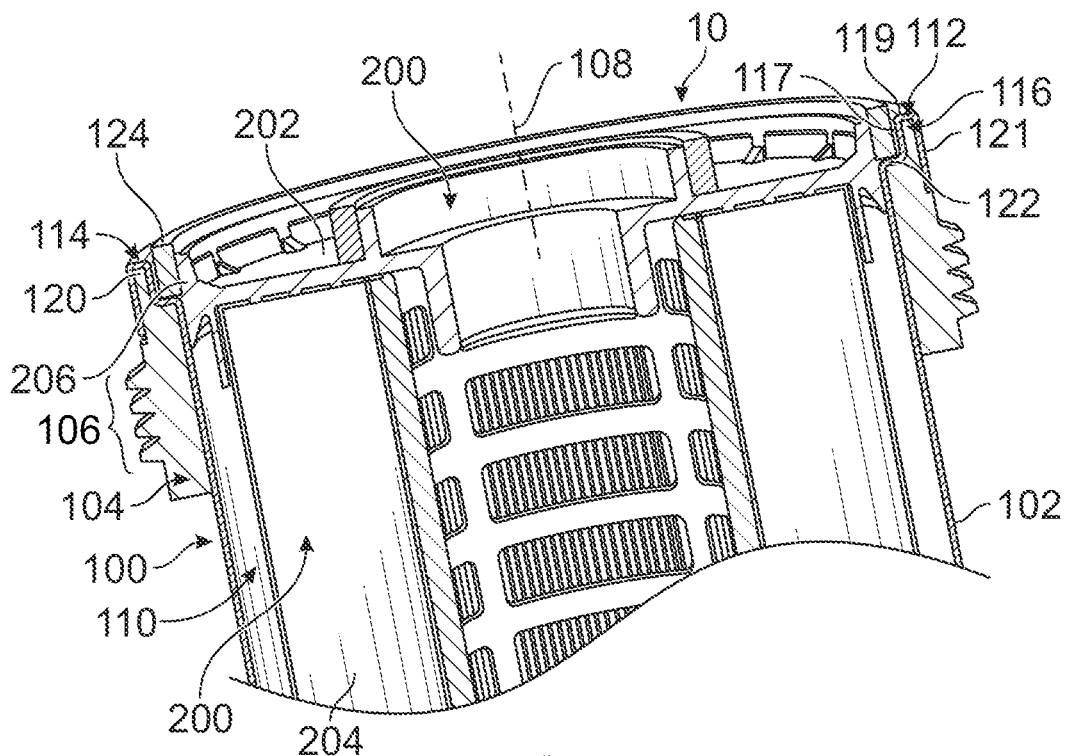
FIG. 2 is a side cross-sectional view of the filter assembly of FIG. 1.

As shown in FIG. 1, the filter housing 100 comprises a shell 102. The shell 102 is a generally cylindrical body defining an inner cavity 110 that is configured to receive the filter element 200 therein. The shell 102 may be stamped or otherwise formed from aluminum, steel, or another suitably formable material. The shell 102 also defines an upper lip 112 positioned along an upper edge 114 of the shell 102, proximate to an opening of the inner cavity 110. The upper lip 112 extends along a perimeter of the upper edge 114. The upper lip 112 defines a generally "U" shaped channel 116 extending circumferentially around the shell 102. As shown in FIG. 2, the upper lip 112 includes an inner sidewall 117 (e.g., first axial sidewall), an upper wall 119 extending radially outwardly from an upper end of the inner sidewall 117 (e.g., an upper end of the shell 102), and an outer sidewall 121 (e.g., second axial sidewall) spaced radially apart from the inner sidewall 117 and extending axially downward from the outer edge of the upper wall 119. An open end of the channel 116 faces a lower end 118 (e.g., closed end) of the shell 102.

Figure 3:
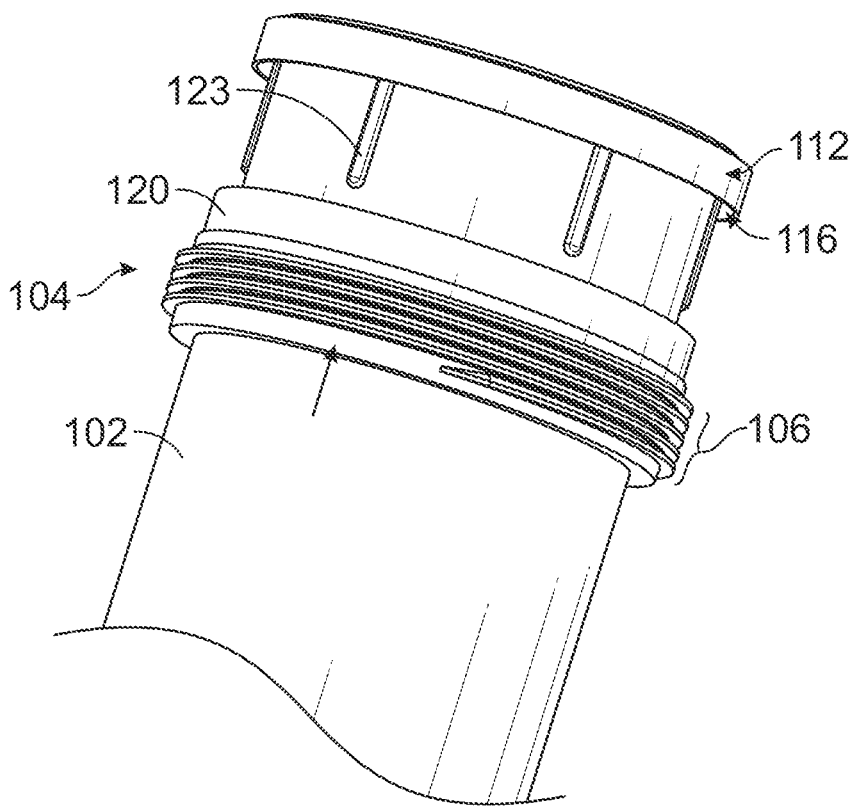
FIG. 3 is a partially exploded view of a filter housing of the filter assembly of FIG. 1.
Figure 4:
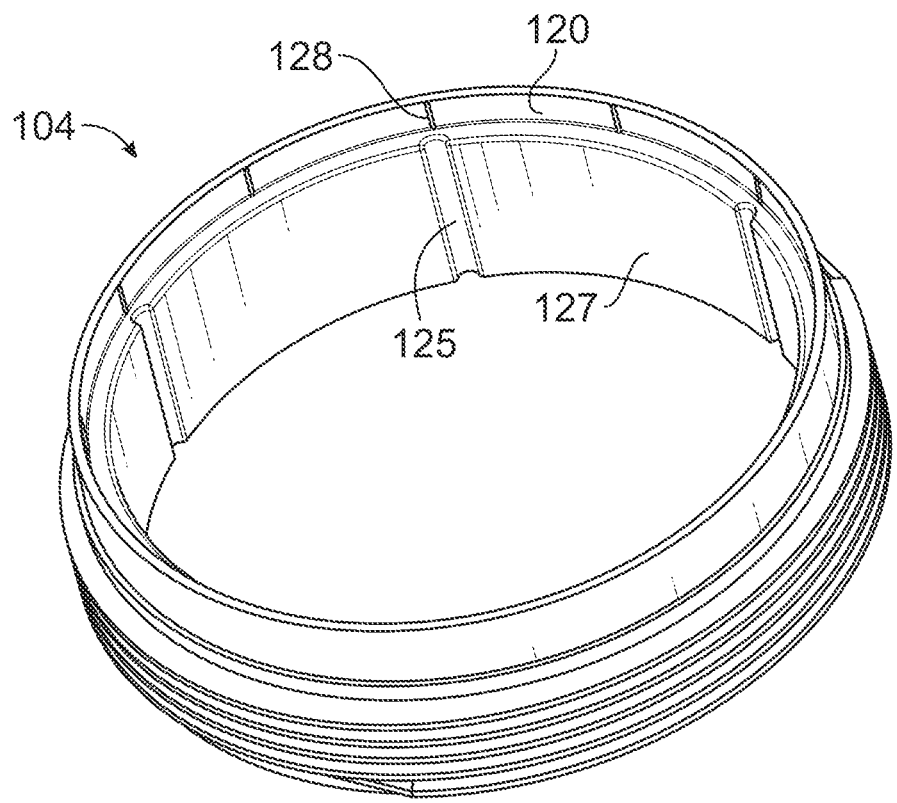
FIG. 4 is a perspective view of a connecting ring of the filter housing of FIG. 3.

The upper lip 112 is sized to receive a portion of the connecting ring 104 therein to secure the connecting ring 104 in position relative to the shell 102 (e.g., to prevent rotation of the connecting ring 104 with respect to the shell 102, etc.). More specifically, the upper lip 112 is sized to receive a cylindrical extension 120 of the connecting ring 104 that protrudes in an axial direction above the threaded region 106 (e.g., that extends axially away from an end of the threaded region). As shown in FIG. 3, the cylindrical extension 120 may be inserted into the channel 116 of the shell 102 from the lower end 118 thereof. The connecting ring 104 includes at least one connecting member that is disposed on the cylindrical extension 120, and that is structured to engage the shell 102 (e.g., the channel 116) to couple the connecting ring 104 to the shell 102. In the embodiment of FIG. 3, the at least one connecting member is a plurality of crush ribs 128 that protrude in a radial direction from an inner surface of the cylindrical extension 120 toward the central axis of the connecting ring 104. A thickness of the cylindrical extension 120 at the location of each of the crush ribs 128 is greater than the width of the channel 116 such that the crush ribs 128 bend, deform, or otherwise compress during assembly. The compression of the cylindrical extension 120 at the crush ribs 128 secures the connecting ring 104 to the shell 102. As shown in FIG. 4, the connecting ring 104 is a cylindrical ring that extends circumferentially about the central axis. The connecting ring 104 may be molded or otherwise formed as a single unitary body from plastic. In other embodiments, the connecting ring 104 is machined or otherwise formed from aluminum or another suitable material.

Figure 5:
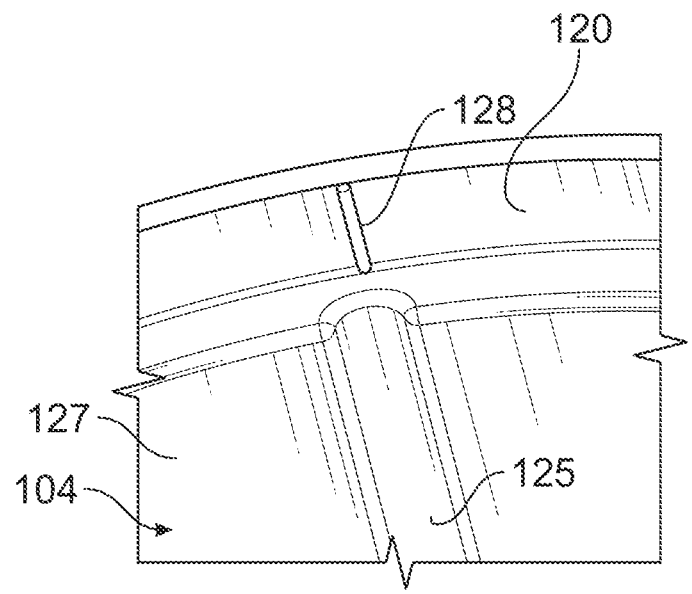
FIG. 5 is a perspective view of a portion of the connecting ring of FIG. 4.

As shown in FIG. 3, the shell 102 also includes a first plurality of alignment members 123 (e.g., ribs, protrusions, etc.) disposed in equal intervals along an outer surface of the shell 102. As shown in FIG. 3, the first plurality of alignment members 123 extend in an axial direction parallel to the central axis 108 of the shell 102 (e.g., between opposing ends of the shell 102) from the channel 116 to an intermediate position between the upper end and the lower end 118. The first plurality of alignment members 123 are configured to engage with a second plurality of alignment members 125 to prevent rotation of the connecting ring 104 relative to the shell 102 during installation of the filter cartridge 10 to the engine or filter head. In the embodiment of FIG. 3, the first plurality of alignment members 123 comprise ribs having an approximately "C" shaped cross-section. As shown in FIG. 5, the second plurality of alignment members 125 comprise grooves (e.g., slots, channels, recessed areas, etc.) formed into an inner surface 127 of the connecting ring 104. The grooves are shaped complementary to the ribs (e.g., "C" shaped grooves that extend axially along an inner surface of the threaded portion of the connecting ring 104) and are sized to receive the ribs of the shell 102 therein.

To install the connecting ring 104 to the shell 102, the connecting ring is positioned over a closed end of the shell 102 and moved in an axial direction toward the upper lip 112. Next, the cylindrical ring 104 is rotated to align the grooves in the cylindrical ring 104 with the ribs in the shell 102 (to rotationally align the first plurality of alignment members 123 with the second plurality of alignment members 125). The cylindrical ring 104 is then pressed toward the open end of the shell 102, forcing the cylindrical extension 120 into the channel 116 and deforming the crush ribs 128 to secure the cylindrical extension 120 within the channel 116. In at least one embodiment, the crush ribs 128 deform under normal hand pressure from a technician to snap the connecting ring 104 into the channel 116. In another embodiment, a press (e.g., hydraulic press, pneumatic press, etc.) may be used to install the connecting ring 104 and to increase the holding force between the connecting ring 104 and the shell 102.

As shown in FIG. 2, the shell 102 also defines a ledge 122 at a location where the upper lip meets the lower elongated cylindrical portion of the shell 102 that defines the inner cavity 110. The ledge 122 extends radially inward from the upper lip 112 in perpendicular orientation relative to the central axis 108 of the shell 102. As shown in FIG. 2, the ledge 122 is sized to receive an axially directed sealing member 124 (e.g., gasket, O-ring, etc.) that is configured to form an axial seal with a filter head (not shown) and separate the inner cavity 110 from an environment surrounding the shell 102. As shown in FIG. 1, an end cap 202 of the filter element 200 is configured to engage an inner surface of the shell 102 just below the ledge 122. The end cap 202 is coupled to (e.g., glued or otherwise bonded to) an upper end of a media pack 204 of the filter element 200 and couples the media pack 204 to the filter housing 100. The axially directed sealing member 124 is positioned between a surface of the end cap 202 (e.g., an axially extending sidewall 206 of the end cap 202) and the shell 102 (e.g., the upper lip 112), and is spaced apart from the connecting ring by the ledge 122 and the inner sidewall 117 of the upper lip 112.

Figure 6:
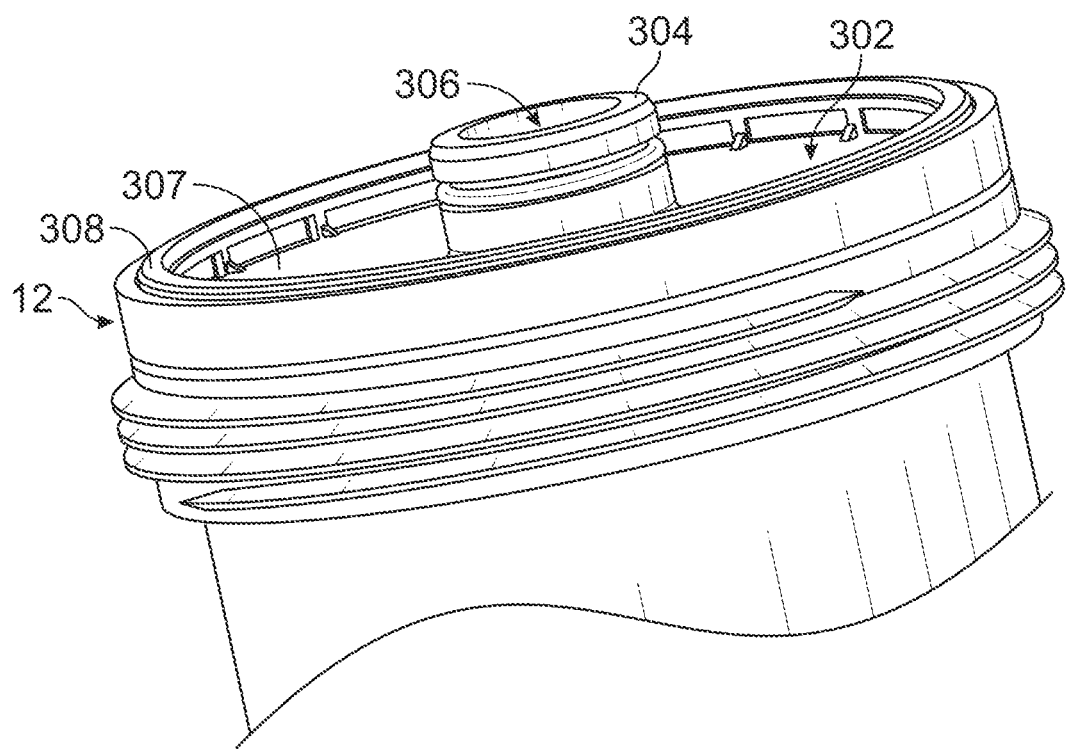
FIG. 6 is a perspective view of a filter assembly portion, according to another embodiment.
Figure 7:
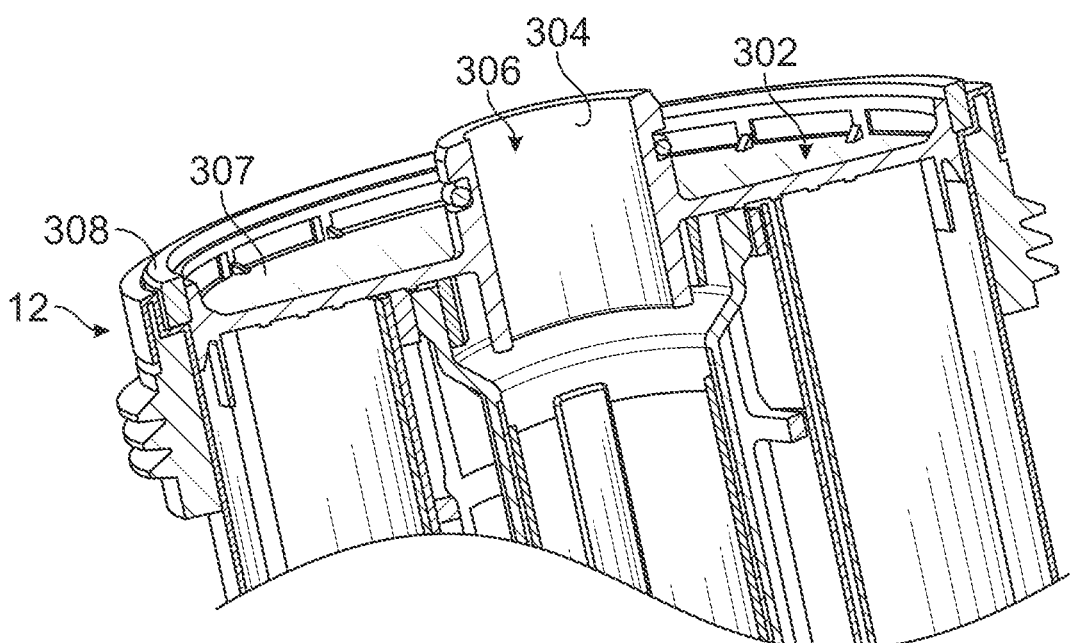
FIG. 7 is a partial perspective view the filter assembly portion of FIG. 6.

The design of the connecting ring 104 and shell 102 of FIGS. 1-5 should not be considered limiting. It will be appreciated that various alternative and/or combinations are possible without departing from the inventive concepts disclosed herein. For example, FIGS. 6-7 show a filter cartridge 12 that is similar to the filter cartridge 10 of FIGS.

1-5, but that includes a slightly different end cap geometry for the filter cartridge. In particular, the end cap 302 includes a centertube 304 that defines a central opening 306 for the end cap 302. The centertube 304 extends axially upwardly from a base 307 (e.g., planar wall) of the end cap 302 and toward the filter head. The end cap 302 also includes a groove (e.g., channel, notch, etc.) in an outer surface of the centertube 304 and extending circumferentially about the centertube 304, and a sealing member 308 disposed within the groove and protruding radially outward from the groove. The sealing member 308 is configured to form a radial seal with a portion of the filter head.

Figure 8:
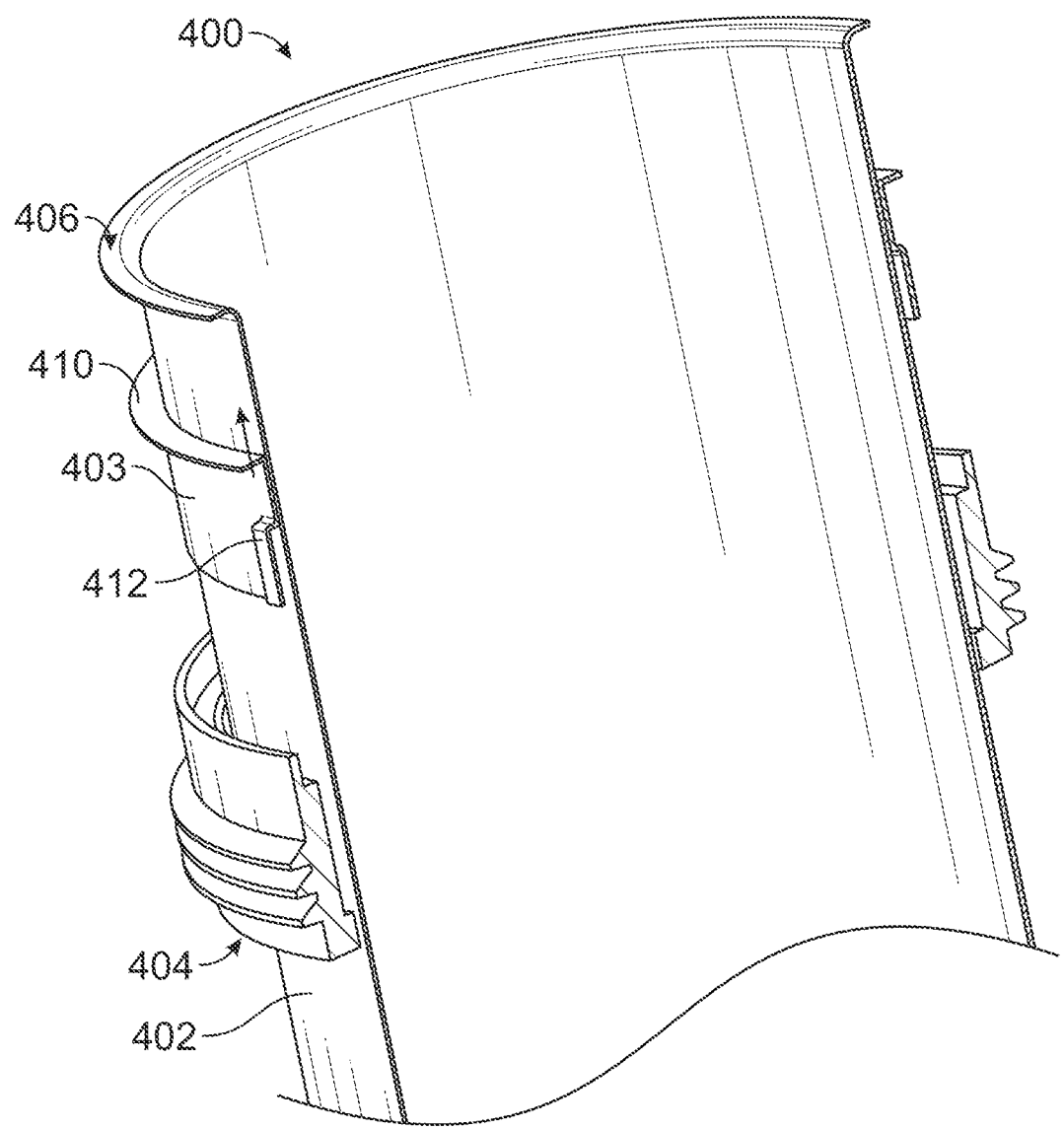
FIG. 8 is a partial perspective view of a shell portion of a filter assembly, according to another embodiment.
Figure 9:
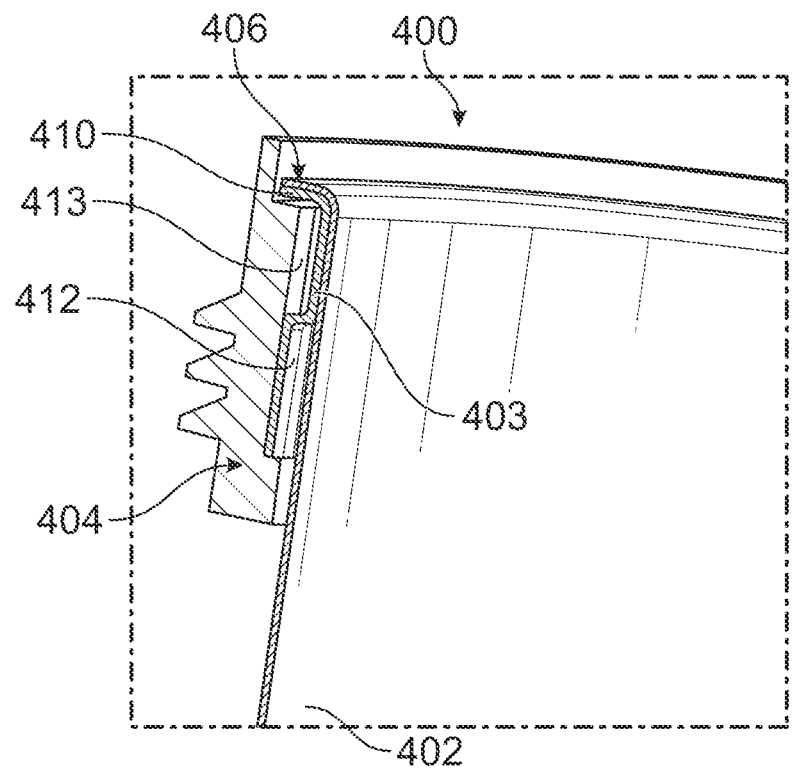
FIG. 9 is a partial perspective view of a lip portion of the filter assembly of FIG. 8.
Figure 10:
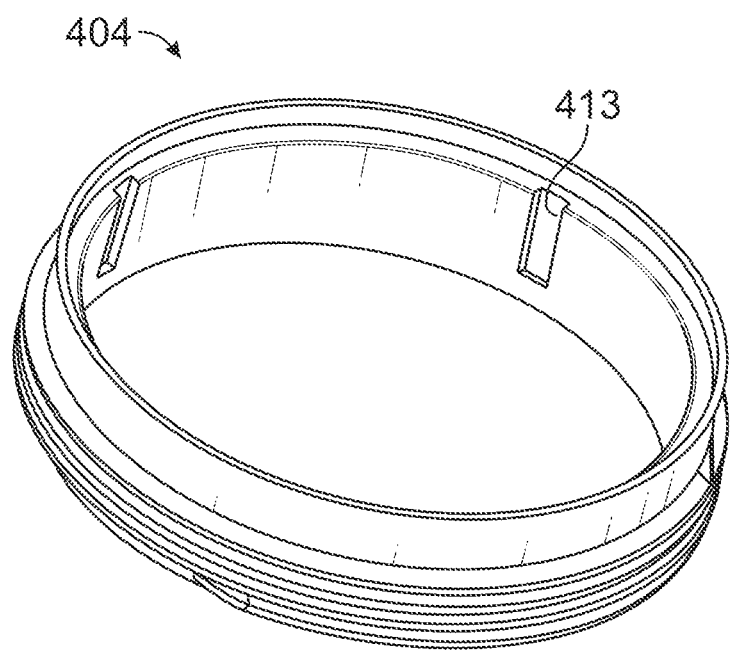
FIG. 10 is a perspective view of a connecting ring of the filter assembly of FIG. 8.
Figure 11:
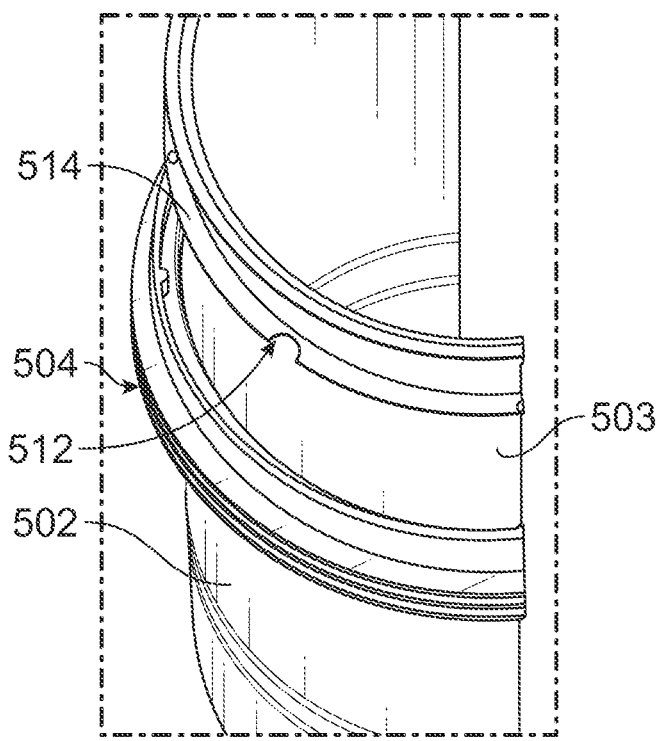
FIG. 11 is a partial perspective view of a shell portion of a filter assembly, according to another embodiment.
Figure 12:
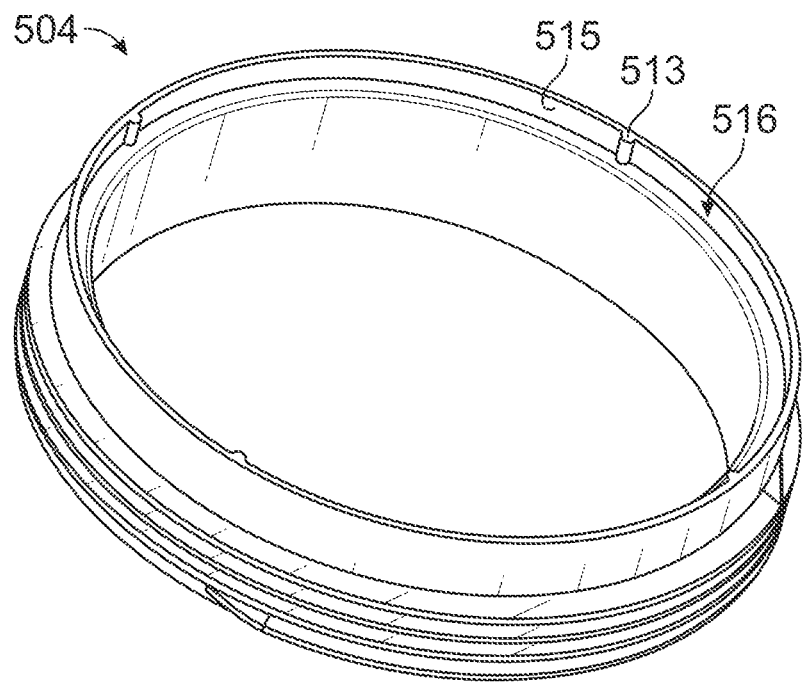
FIG. 12 is a perspective view of a connecting ring of the filter assembly of FIG. 11.
Figure 13:
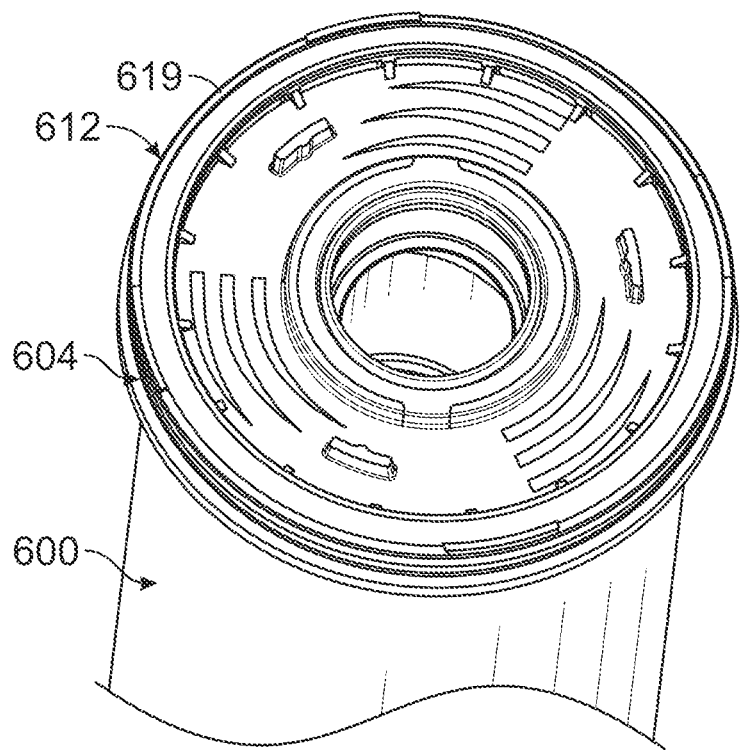
FIG. 13 is a perspective view of a filter assembly portion, according to another embodiment.
Figure 14:
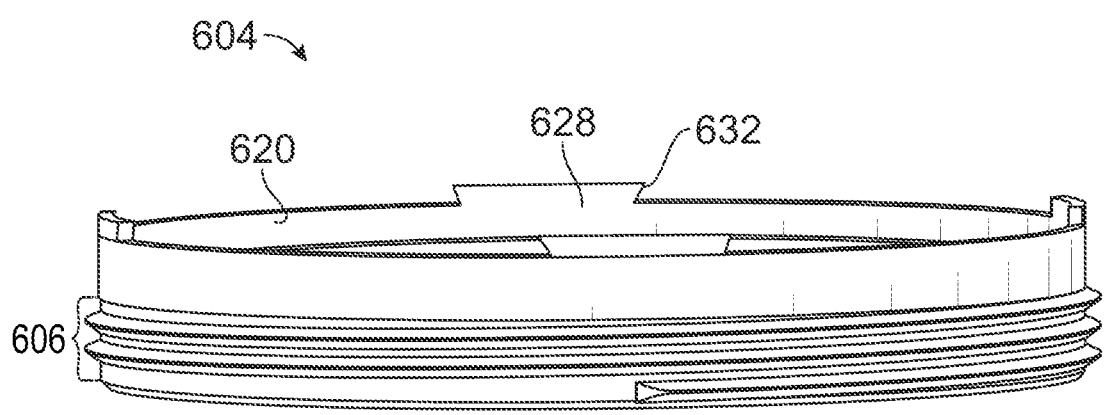
FIG. 14 is a perspective view of a connecting ring of the filter assembly of FIG. 13.
Figure 15:
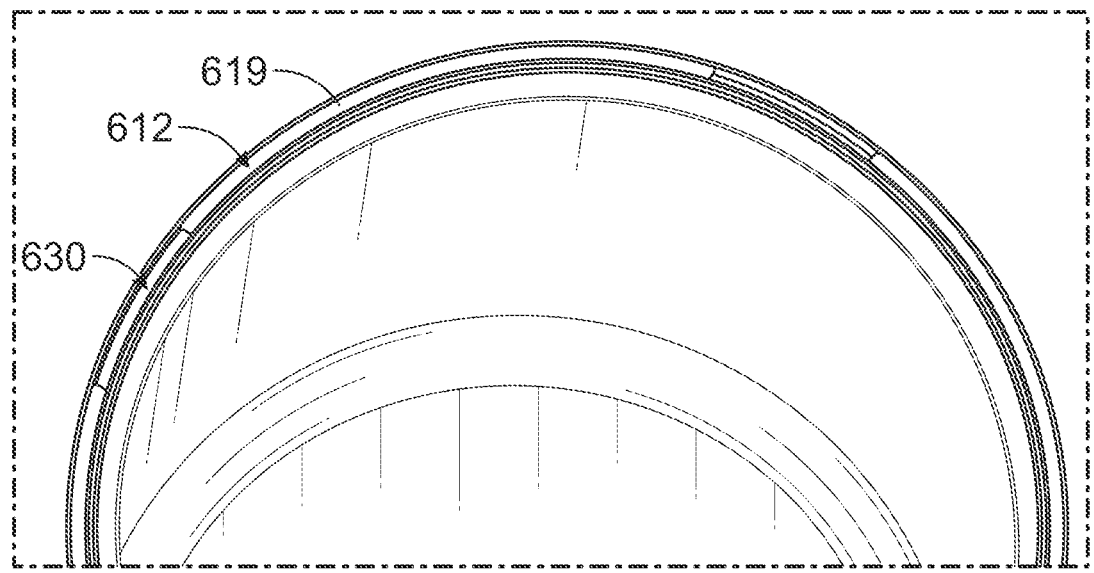
FIG. 15 is a perspective view of a shell portion of the filter assembly of FIG. 13.

FIGS. 8-10 show a filter housing 400 that includes an alignment sleeve 403 that rotationally couples (e.g., prevents rotation of) the connecting ring 404 of the filter housing 400 relative to the shell 402. The alignment sleeve 403 is formed separately from the shell 402 (e.g., is a separate piece from the shell 402) that is welded or otherwise coupled to the outer surface of the shell 402 and/or the upper lip 406. As shown in FIGS. 8-9, the alignment sleeve 403 is a cylindrically-shaped ring that is inserted over the shell 402 and that abuts an upper lip 406 of the shell 402. FIG. 8 shows the alignment sleeve 403 after being installed onto the shell 402. FIG. 9 shows the alignment sleeve 403 pressed against the upper lip 406 in the fully installed position. The alignment sleeve 403 includes a flange 410 at an upper end of the alignment sleeve 403 that extends radially outward from the shell 402. An upper surface of the flange 410 engages a lower surface of the upper lip 406 so to position the alignment sleeve 403 axially along the shell 402. In at least one embodiment, the flange 410 is welded to the upper lip 406. The alignment sleeve 403 includes a first plurality of alignment members 412 disposed along a circumference of the alignment sleeve 403. As shown in FIGS. 8-9, the first plurality of alignment members 412 comprise protrusions that are stamped or otherwise formed into the alignment sleeve 403, and that extend radially outward from the alignment sleeve 403. The protrusions engage with a second plurality of alignment members 413, for example, notches that extend axially along an inner surface of the connecting ring 404. As shown in FIG. 10, the notches extend to an intermediate position between opposing ends of the inner surface which, advantageously, prevents debris from penetrating the lower end of the connecting ring 404 and improves the overall aesthetic of the filter housing 400. It will be appreciated that the shape and position of the first plurality of alignment members 412 and the second plurality of alignment members 413 may differ in various embodiments. For example, FIGS. 11-12 show another embodiment of an alignment sleeve 503 for a filter assembly in which the first plurality of alignment members 512 include "C" shaped notches that are disposed in a radially extending flange 514 of the alignment sleeve 503. The notches engage with a second plurality of alignment members 513, for example, ribs that extend radially inward from an inner surface 515 of the connecting ring 504 (e.g., an inner surface of the cylindrical extension 516 of the connecting ring 504). In other embodiments, the position of the ribs may be different (e.g., the ribs may be disposed along an inner surface of the threaded portion of the connecting ring, etc.). In at least one embodiment, the notches engage the ribs in a friction fit arrangement to substantially prevent removal of the connecting ring 504 from the alignment sleeve 503. In other embodiments, the connecting ring 504 is slidably engaged with the alignment sleeve 503 and is removable from the alignment sleeve 503 (and shell 502) during service events.

Figure 16:
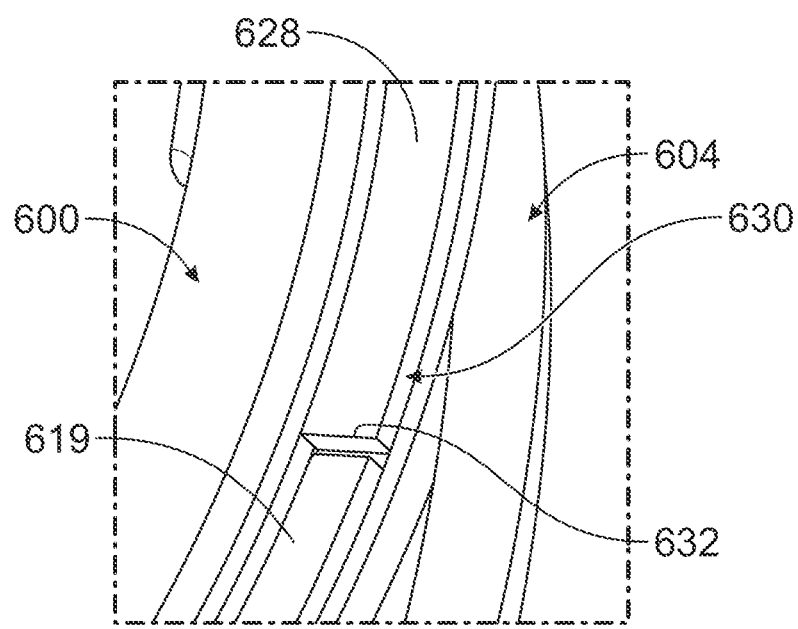
FIG. 16 is a perspective view of a lip portion of the shell of FIG. 15.

FIGS. 13-16 show a filter housing 600 that includes interlocking elements on the connecting ring 604 and shell 602. In particular, the connecting ring 604 includes a plurality of tabs 628 (e.g., clips, etc.) that extend in an axial direction from a cylindrical extension 620 of the connecting ring 604 that extends axially away from an outer end of the threaded region 606. As shown in FIG. 16, each of the tabs 628 is engaged with a respective one of a plurality of apertures 630 (e.g., windows, openings, etc.) disposed in an upper wall 619 of the upper lip 612 of the shell 602. The circumferential ends 632 of each of the tabs 628 are tapered, so that a circumferential width of the tabs 628 at an outer axial end of the tabs 628 is greater than a circumferential width of the tabs 628 proximate to the cylindrical extension 620, to impede the connecting ring 604 from becoming separated from the shell 602 once the tabs 628 are fully engaged with the apertures 630. The interlocking arrangement of tabs 628 and apertures 630 also prevents rotation of the connecting ring 604 with respect to the shell 602.

Figure 17:
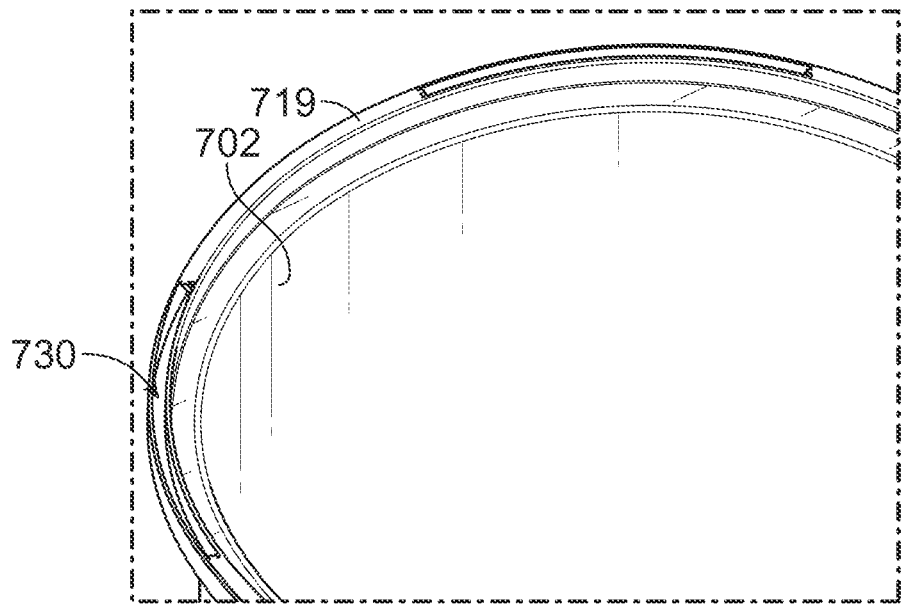
FIG. 17 is a perspective view of a shell portion of a filter assembly, according to another embodiment.
Figure 18:
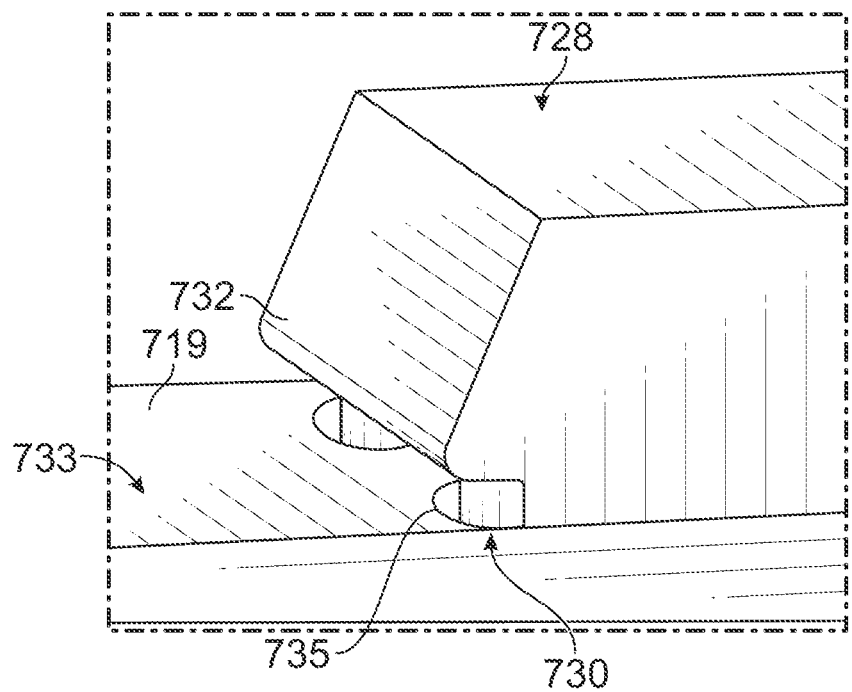
FIG. 18 is a perspective view of a lip portion of the shell of FIG. 17 engaged with a connecting ring of the filter assembly.
Figure 19:
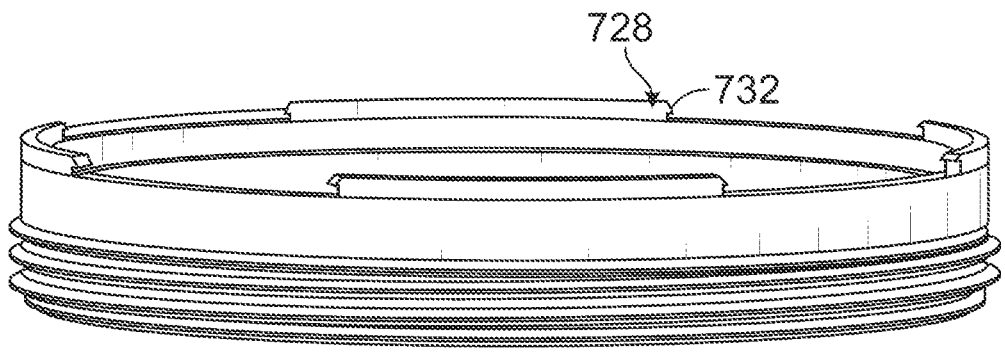
FIG. 19 is a perspective view of the connecting ring of FIG. 18.
Figure 20:
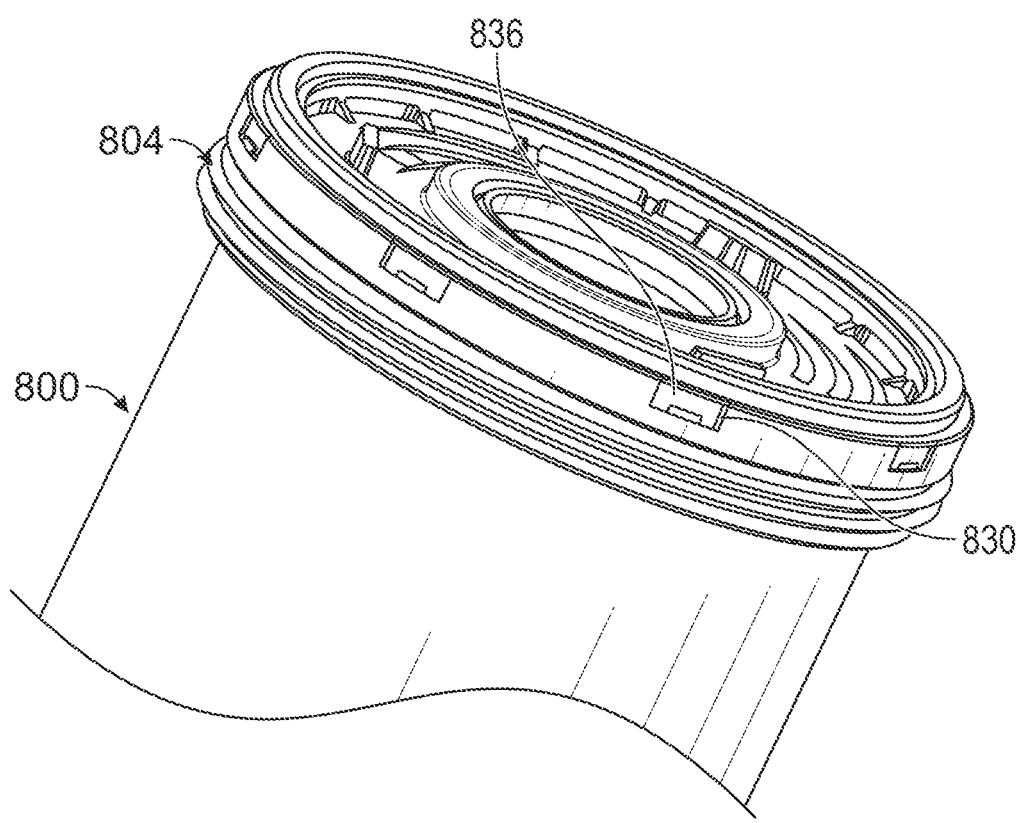
FIG. 20 is a perspective view of a filter assembly portion, according to an embodiment.

FIGS. 17-19 show a variation of a filter housing 600 design of FIGS. 13-16 in which the ends of each tab 728 includes connecting lips 732 (e.g., latches, clips, etc.) that engage with and latch onto an upper surface 733 of the upper wall 719 above the apertures 730. As shown in FIG. 18, the connecting lips 732 are formed as a triangular wedge that extends outwardly from either circumferential end of each tab 728. The upper wall 719 of the shell 702 may also include cutouts 735 on either circumferential end of each the apertures 730 to facilitate engagement between the connecting lips 732 and the upper wall 719.

Figure 21:
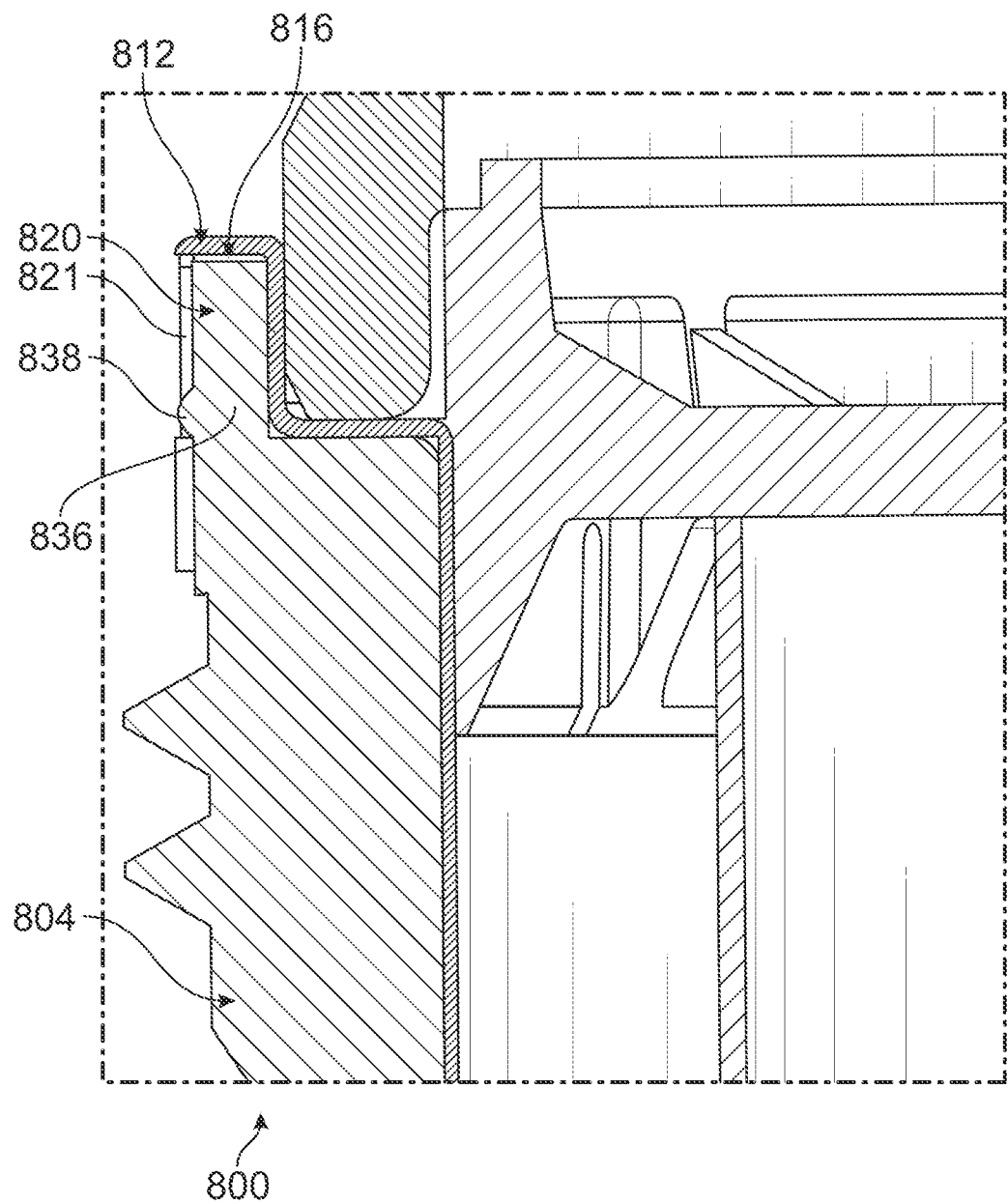
FIG. 21 is a side cross-sectional view of a portion of the filter assembly portion of FIG. 20.
Figure 22:
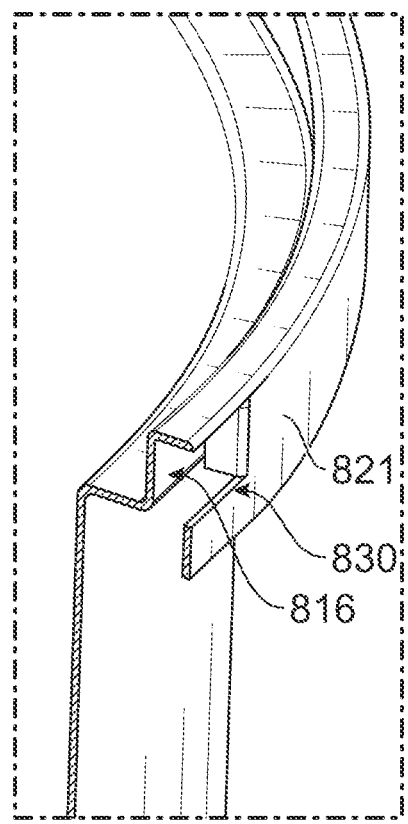
FIG. 22 is a perspective view of a shell portion of the filter assembly of FIG. 20.
Figure 23:
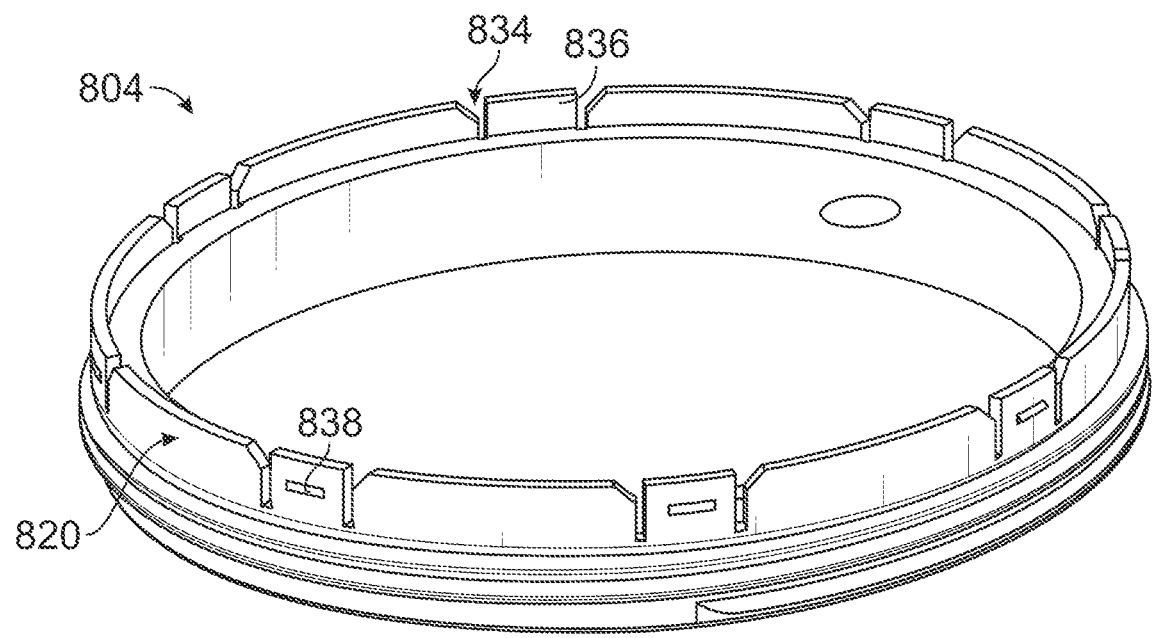
FIG. 23 is a perspective view of a connecting ring of the filter assembly of FIG. 20.
Figure 24:
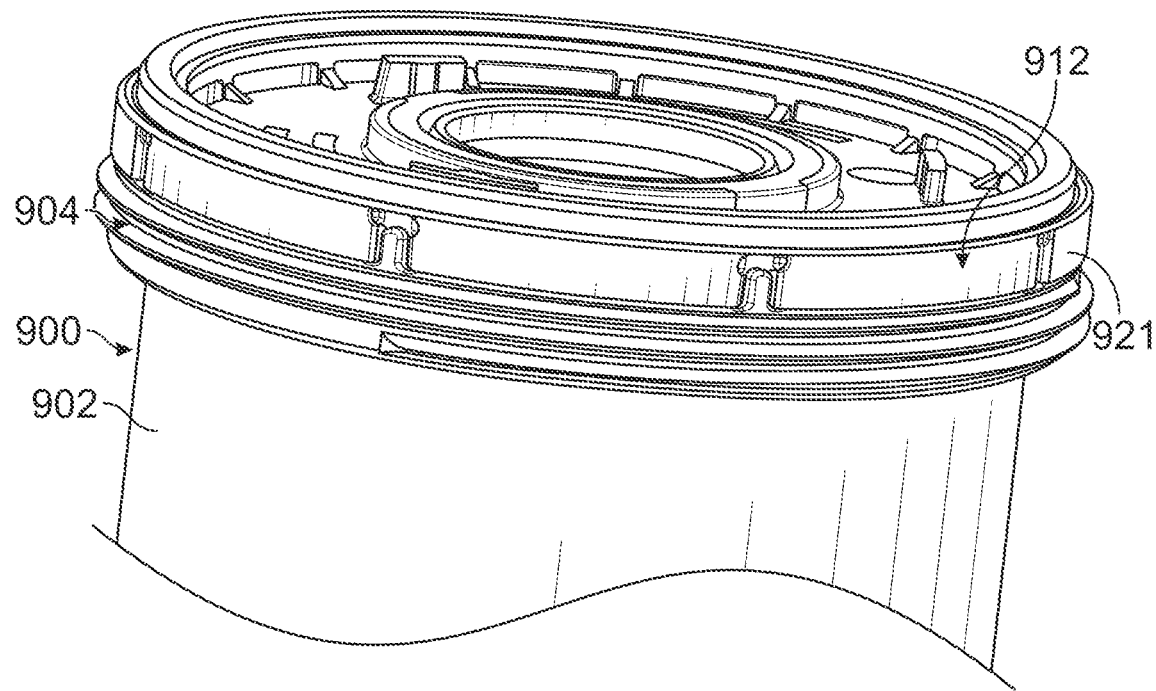
FIG. 24 is a perspective view of a filter assembly portion, according to another embodiment.

FIGS. 20-23 show yet another variation of the filter housing 600 of FIGS. 13-16 in which the apertures 830 (e.g., openings, windows, slots, etc.) are disposed in an outer sidewall 821 of the upper lip 812 of the filter housing 800. As shown in FIG. 23, the connecting ring 804 includes a plurality of slots 834 that are disposed in the cylindrical extension 820. The slots 834 extend axially through the cylindrical extension 820 and define a plurality of movable clips 836 in the cylindrical extension. Each one of the movable clips 836 includes a protrusion 838 disposed at a central position on an outer surface of each one of the movable clips 836. In the embodiment of FIG. 23, each protrusion 838 is a rib extending in a substantially circumferentially direction across an outer face (e.g., surface) of a respective one of the movable clips 836. As shown in FIG. 21, during installation, the movable clips 836 are structured to bend radially inward as the connecting ring 804 is inserted into the channel 816, and to bend radially outward to engage with a lower edge of a respective one of the apertures 830 when the connecting ring 804 is fully engaged with the channel 816. The size, shape, and position of the movable clips 836 and each protrusion 838 may be different in various embodiments.

Figure 25:
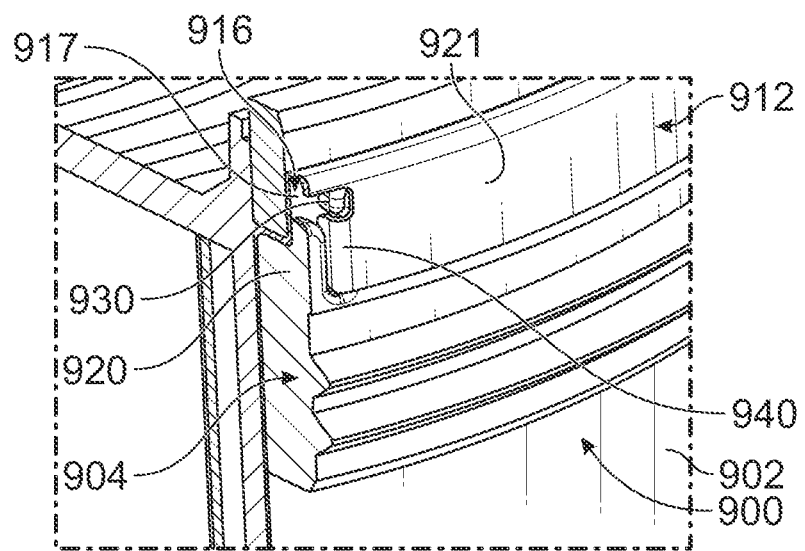
FIG. 25 is a partial perspective view of a portion of the filter assembly of FIG. 24.
Figure 26:
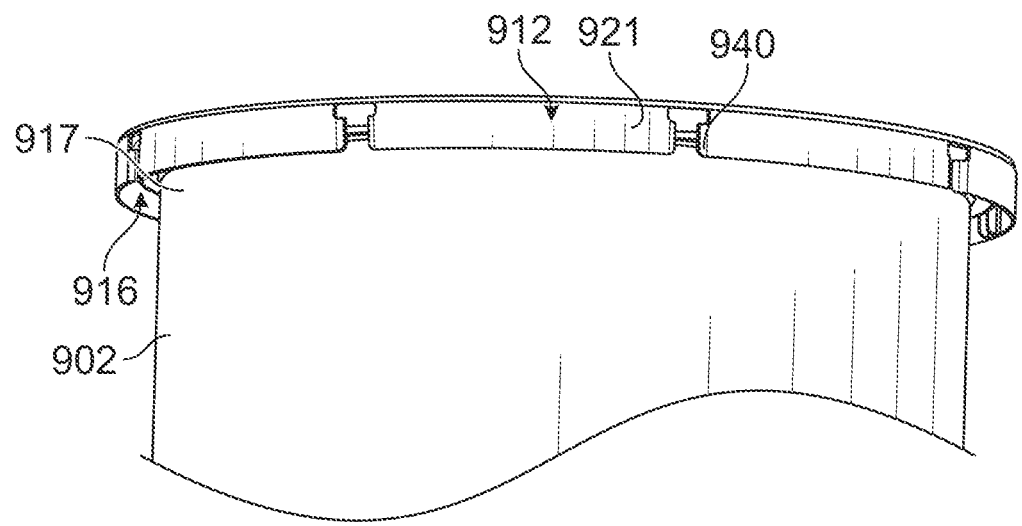
FIG. 26 is a perspective view of a shell portion of the filter assembly of FIG. 24.
Figure 27:
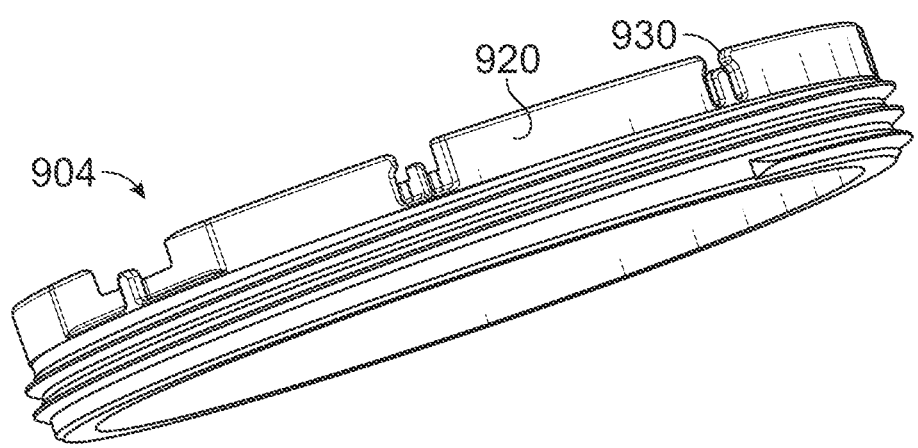
FIG. 27 is a perspective view of a connecting ring of the filter assembly of FIG. 24.

FIGS. 24-27 show another variation of the filter housing 800 design of FIGS. 20-23 in which the tabs 930 in the connecting ring 904 of the filter housing 900 engage with (e.g., latch onto) receiving latches 940 (e.g., receiving tabs, etc.) formed in the upper lip 912. As shown in FIG. 26, the receiving latches 940 are formed by folding sections of the outer sidewall 921 of the upper lip 912 into the channel 916 and toward the inner sidewall 917 (e.g., curling two circumferentially extending flaps back toward the inner sidewall 917). As shown in FIG. 27, the tabs 930 of the connecting ring 904 are formed by "W" shaped cuts in the cylindrical extension 920. As shown in FIG. 25, the tabs 930 extend in a circumferential direction over the receiving latches 940 when the connecting ring 904 is fully installed onto the shell 902. The size, position, and number of the tabs 930 and receiving latches 940 may be different in various embodiments.

Figure 28:
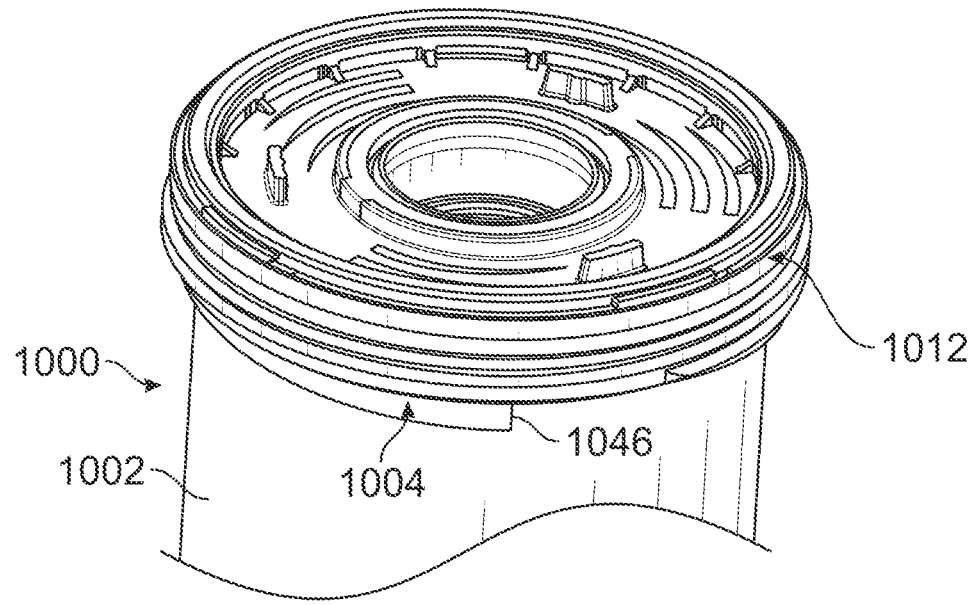
FIG. 28 is a perspective view of a filter assembly portion, according to another embodiment.
Figure 29:
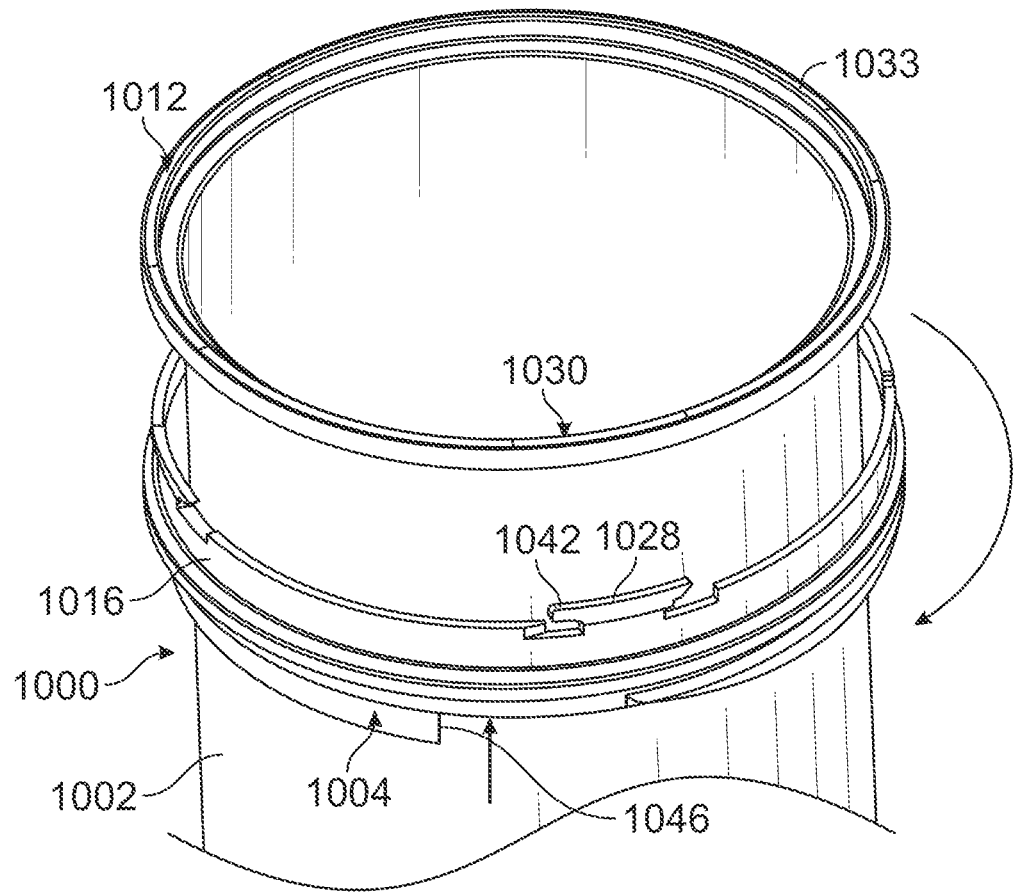
FIG. 29 is a partially exploded view of a filter housing portion of the filter assembly of FIG. 28.
Figure 30:
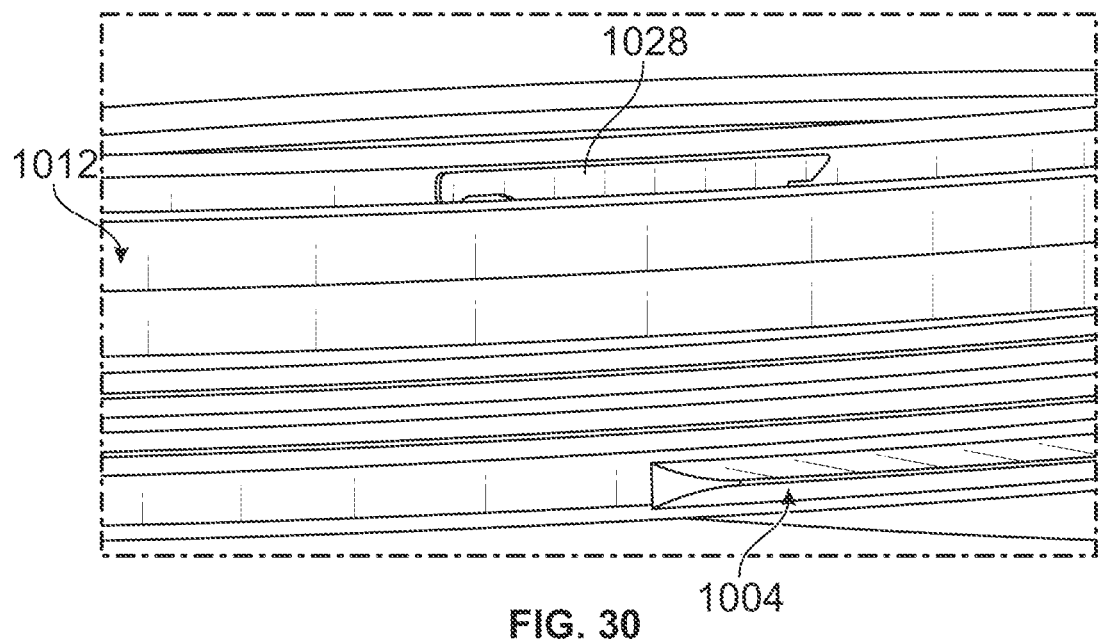
FIG. 30 is a perspective view of a portion of the filter housing of FIG. 29 near an upper end of a shell of the housing.
Figure 31:
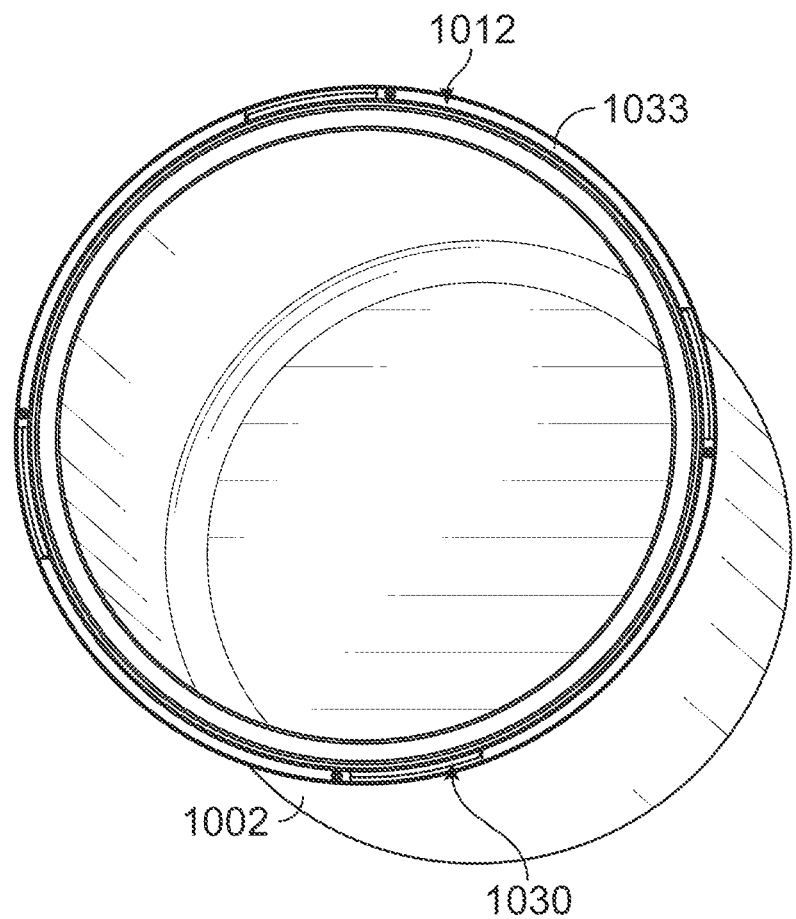
FIG. 31 is a perspective view of a shell portion of the filter housing of FIG. 29.
Figure 32:
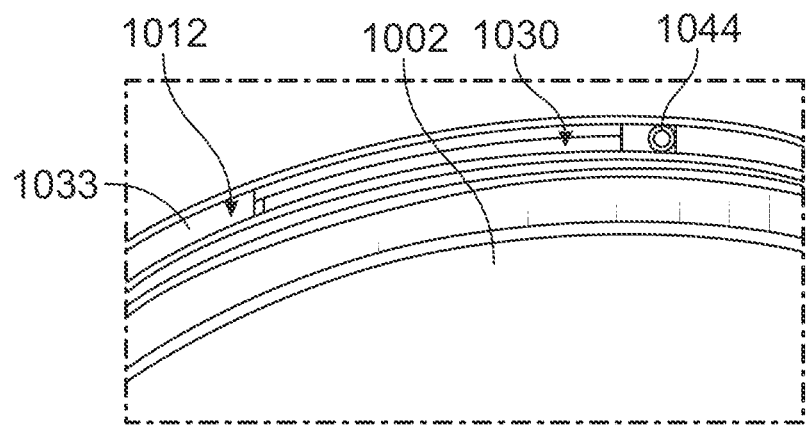
FIG. 32 is a reproduction of a portion of FIG. 31.
Figure 33:
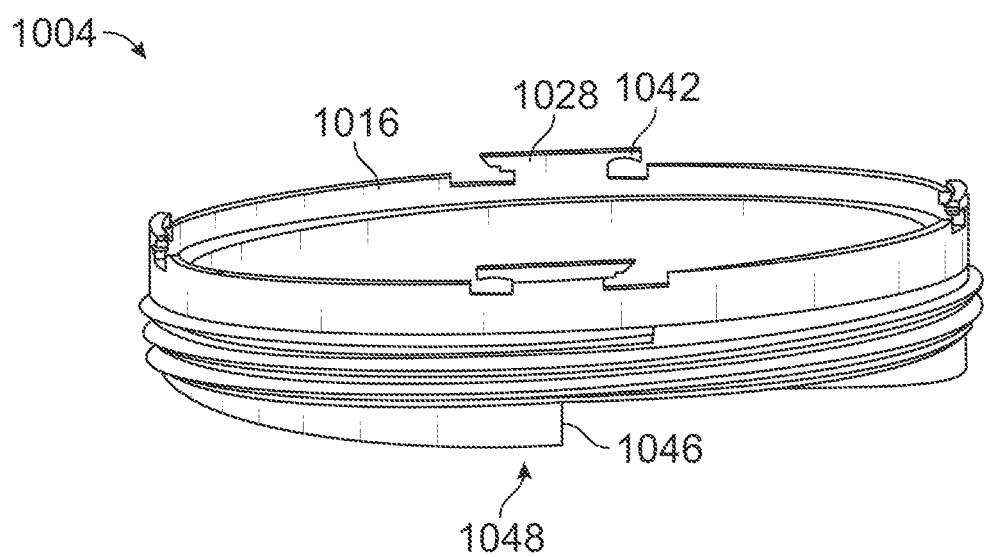
FIG. 33 is a perspective view of a connecting ring of the filter housing of FIG. 28.

FIGS. 28-33 show yet another variation of a filter housing design, shown as filter housing 1000, that includes an interlocking connecting ring 1004. As shown in FIG. 33, the connecting ring 1004 includes a plurality of tabs 1028 that are disposed on an outer end of the cylindrical extension 1016 and extend axially away from the cylindrical extension 1016. Each one of the tabs 1028 on the connecting ring 1004 includes one or more overhanging ledges 1042 that extend in a circumferential direction along a perimeter of the connecting ring 1004. The overhanging ledges 1042 are configured to engage with an upper surface 1033 of the upper lip 1012. In the embodiment of FIGS. 28-33, the overhanging ledges 1042 are configured to engage with one of a plurality of dimples 1044 (see FIG. 32) or similar protrusion formed on the upper surface 1033 of the upper lip 1012. As shown in FIG. 29, the connecting ring 1004 is connected to the shell 1002 by sliding the tabs 1028 into corresponding apertures in the upper lip 1012 and then rotating the connecting ring 1004 (e.g., clockwise when viewed from an upper end of the shell 1002) to engage each overhanging ledge 1042 with a respective one of the dimples 1044. As shown in FIG. 28, the connecting ring 1004 also includes a drive element 1046 (ledge, step, etc.) disposed at a lower axial end 1048 of the connecting ring 1004 opposite the cylindrical extension 1016. In the embodiment of FIGS. 28-33, the drive element 1046 is configured to engage with a tool or fixture to facilitate rotation of the connecting ring 1004 with respect to the shell 1002 (e.g., to engage each overhanging ledge 1042 with a respective one of the dimples 1044 on the upper lip 1012).

Figure 34:
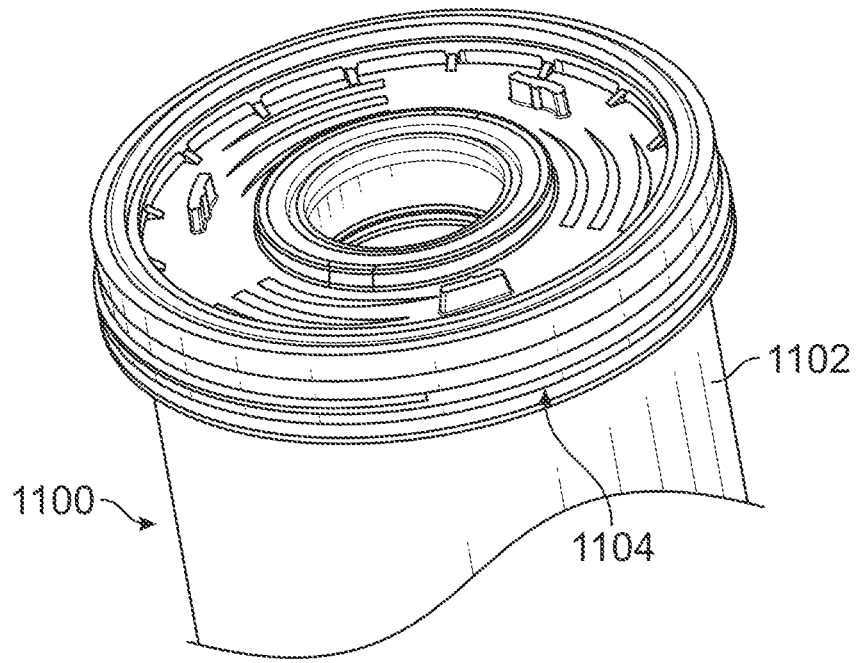
FIG. 34 is a perspective view of a filter assembly portion, according to another embodiment.
Figure 35:
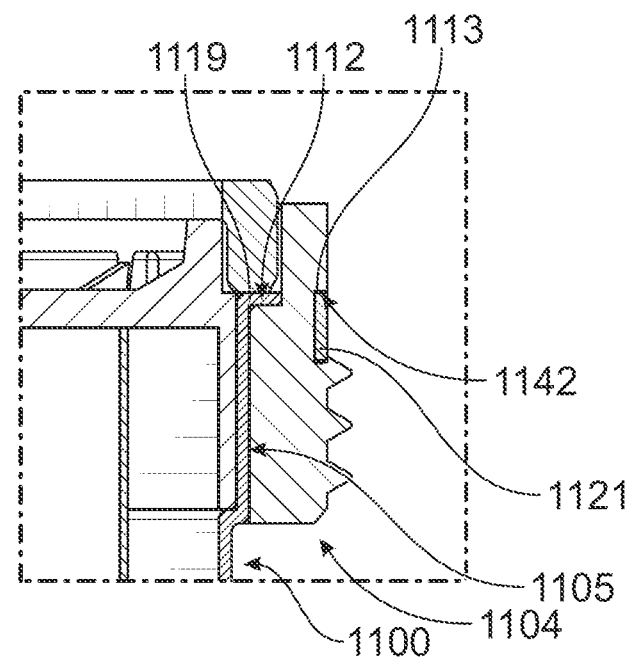
FIG. 35 is a side cross-sectional view of a portion of the filter assembly of FIG. 34
Figure 36:
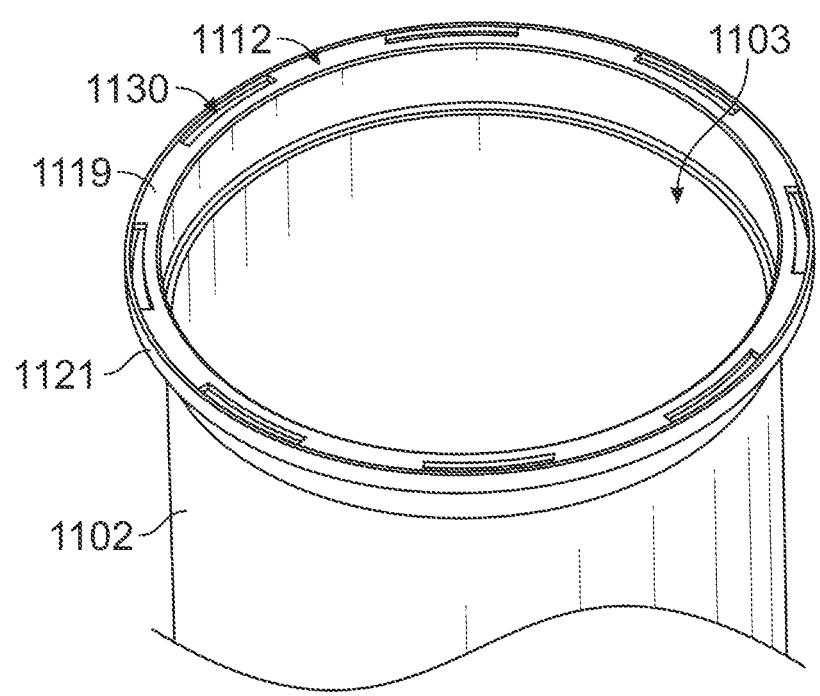
FIG. 36 is a perspective view of a shell portion of the filter assembly of FIG. 34.

FIGS. 34-36 show a filter housing 1100 that includes a connecting ring 1104 that is overmolded onto the shell 1102 (e.g., to an upper lip 1112 portion of the shell 1102) adjacent to the opening 1103 of the shell 1102, according to an embodiment. As shown in FIG. 35, the shell 1102 may be placed in a fixture and/or injection molding tool and a plastic material may be dispensed onto the outer surfaces 1105 of the shell 1102 and through apertures 1030 in the upper lip 1112 (e.g., apertures 1030 in the upper wall 1119 of the upper lip 1112). The mold may be shaped so that the plastic forms a latch 1113 that engages an upper surface 1142 of the upper lip 1112. In another embodiment, the connecting ring 1104 may be overmolded through apertures disposed on an outer sidewall 1121 of the upper lip 1112 or a combination of apertures on the outer sidewall 1121 and the upper wall 1119.

Figure 37:
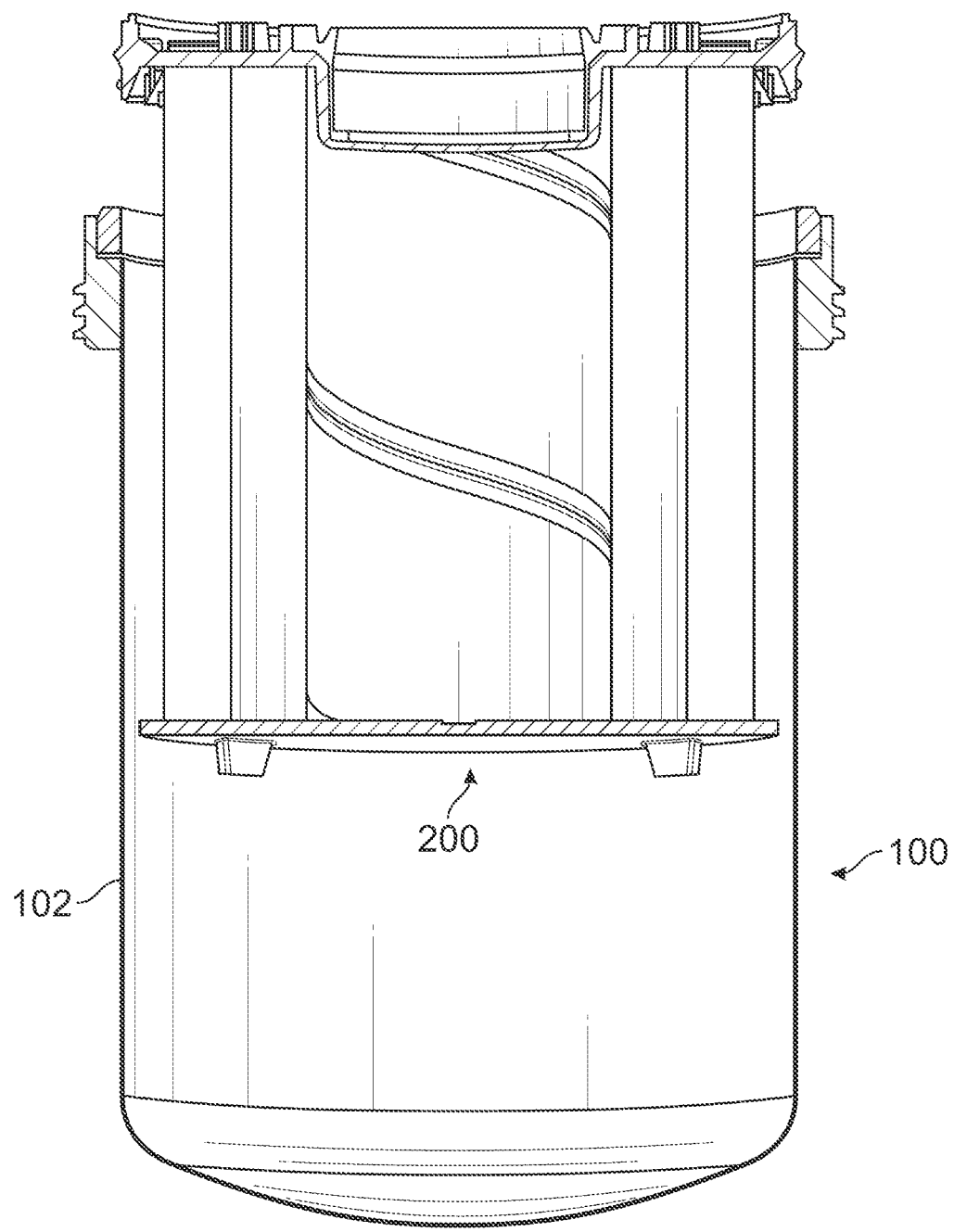
FIG. 37 is a side cross-sectional view of a filter assembly, according to another exemplary embodiment.

In any of the above embodiments, the filter element may be removable from the filter housing such that the filter housing may be reused. For example, FIG. 37 shows the filter element 200 at least partially separated from the filter housing 100 of FIGS. 1-5, according to an embodiment. The shell 102 is of sufficient thickness to allow for repeated use. In the embodiment of FIG. 37, the thickness of the shell 102 in a radial direction is approximately 1 mm. The thickness of the shell 102 may vary depending on the application (e.g., depending on the maximum fluid pressure through the filtration system, etc.).

The filter housing design of various embodiments described herein provides several benefits over traditional spin-on filter housings. Among other benefits, the two-piece design of various embodiments minimizes the number of components needed to form a threaded region on the shell and simplifies manufacturing operations by eliminating the need for complex embedding and/or seaming operations.

Moreover, because the threads are formed on the outside of the shell (e.g., the dirty side of the filter element assembly), the risk of introducing contaminants to the clean side of the filter element during manufacturing and assembly is greatly reduced.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filter assembly, comprising:
   a shell comprising:
      a body defining:
         an inner cavity;
         an upper lip, the upper lip disposed along an upper edge of the inner cavity, the upper lip defining a channel; and
         a ledge positioned between the upper lip and a lower elongated cylindrical portion of the shell, the ledge extending radially inward; and
      a connecting ring positioned outside of the inner cavity and engaged with the channel, the connecting ring comprising a threaded region extending along a central axis of the body;
   a filter element removably disposed within the shell, the filter element comprising an end cap that is engaged with the shell; and
   an axially directed sealing member positioned on the ledge and between the body and the end cap, the axially directed sealing member extending axially outward so as to form an axial seal with a filter head when the filter assembly is installed on the filter head.

2. The filter assembly of claim 1, wherein the connecting ring comprises:
   a cylindrical extension coupled to the threaded region and extending axially away from the threaded region;
   a plurality of crush ribs protruding radially from the cylindrical extension and structured to engage the shell to couple the connecting ring to the shell; and
   a plurality of alignment members disposed along an inner surface of at least one of the threaded region or the cylindrical extension, the plurality of alignment members structured to engage with the shell to prevent rotation of the connecting ring relative to the shell.

3. The filter assembly of claim 2, further comprising a plurality of tabs disposed on an opposite end of the cylindrical extension as the threaded region and extending axially away from the cylindrical extension.

4. The filter assembly of claim 2, further comprising:
   a plurality of slots disposed in the connecting ring, the plurality of slots defining a plurality of movable clips; and
   a plurality of protrusions that extend radially outward from the plurality of movable clips.

5. The filter assembly of claim 1, wherein the connecting ring further comprises a cylindrical extension that extends axially away from an end of the threaded region and into the channel.

6. The filter assembly of claim 5, wherein the connecting ring further comprises a plurality of crush ribs that protrude in a radial direction from the cylindrical extension.

7. A filter assembly, comprising:
   a shell comprising:
      a body defining an inner cavity and an upper lip, the upper lip disposed along an upper edge of the inner cavity and defining a channel, wherein the body comprises a plurality of alignment members disposed along an outer surface of the body, the plurality of alignment members extending in an axial direction between opposing ends of the body; and
      a connecting ring positioned outside of the inner cavity and engaged with the channel, the connecting ring comprising a threaded region extending along a central axis of the body, the connecting ring engaging with the plurality of alignment members so as to prevent rotation of the connecting ring relative to the body during installation of the filter assembly;
   a filter element removably disposed within the inner cavity, the filter element comprising an end cap that is engaged with the shell; and
   an axially directed sealing member positioned between the body and the end cap, the axially directed sealing member extending axially outward so as to form an axial seal with a filter head when the filter assembly is installed on the filter head.

8. The filter assembly of claim 7, wherein:
   the body further defines a ledge positioned between the upper lip and a lower elongated cylindrical portion of the shell; and
   the axially directed sealing member is positioned on the ledge.

9. The filter assembly of claim 7, wherein the ledge extends radially inward from the upper lip.

10. The filter assembly of claim 1, wherein the connecting ring is overmolded onto the shell.

* * * * *